United States Patent [19]
Jang et al.

[11] Patent Number: 6,165,406
[45] Date of Patent: Dec. 26, 2000

[54] 3-D COLOR MODEL MAKING APPARATUS AND PROCESS

[75] Inventors: Justin Jang; Wen C. Huang; Bor Z. Jang, all of Auburn, Ala.

[73] Assignee: Nanotek Instruments, Inc., Opelika, Ala.

[21] Appl. No.: 09/321,278

[22] Filed: May 27, 1999

[51] Int. Cl.$^7$ .......................... B29C 41/02; B29C 41/52
[52] U.S. Cl. ..................... 264/308; 347/1; 425/145; 425/375; 700/119
[58] Field of Search ....................... 264/308, 401; 425/145, 375; 347/1; 700/119

[56] References Cited

U.S. PATENT DOCUMENTS

| | | |
|---|---|---|
| 4,665,492 | 5/1987 | Masters . |
| 4,752,352 | 6/1988 | Feygin . |
| 5,015,312 | 5/1991 | Kinzie . |
| 5,059,266 | 10/1991 | Yamane et al. . |
| 5,121,329 | 6/1992 | Crump . |
| 5,136,515 | 8/1992 | Helinski . |
| 5,140,937 | 8/1992 | Yamane et al. . |
| 5,171,360 | 12/1992 | Orme et al. . |
| 5,204,055 | 4/1993 | Sachs et al. . |
| 5,216,616 | 6/1993 | Masters . |
| 5,226,948 | 7/1993 | Orme et al. . |
| 5,257,657 | 11/1993 | Gore . |
| 5,259,593 | 11/1993 | Orme et al. . |
| 5,266,098 | 11/1993 | Chun . |
| 5,301,863 | 4/1994 | Prinz et al. . |
| 5,303,141 | 4/1994 | Batchelder et al. . |
| 5,340,090 | 8/1994 | Orme et al. . |
| 5,340,656 | 8/1994 | Sachs . |
| 5,354,414 | 10/1994 | Feygin . |
| 5,387,380 | 2/1995 | Sachs . |
| 5,402,351 | 3/1995 | Batchelder et al. . |
| 5,490,882 | 2/1996 | Sachs et al. . |
| 5,506,607 | 4/1996 | Sanders et al. . |
| 5,514,232 | 5/1996 | Burns . |
| 5,555,176 | 9/1996 | Menhennett et al. . |
| 5,594,652 | 1/1997 | Penn et al. . |
| 5,617,911 | 4/1997 | Sterett et al. . |
| 5,637,175 | 6/1997 | Feygin et al. . |
| 5,669,433 | 9/1997 | Sterett et al. . |
| 5,718,951 | 2/1998 | Sterett et al. . |
| 5,738,817 | 4/1998 | Danforth et al. . |
| 5,740,051 | 4/1998 | Sanders et al. . |
| 5,746,844 | 5/1998 | Sterett et al. . |
| 5,879,489 | 3/1999 | Burns . |

OTHER PUBLICATIONS

M.Rees, "Color in Rapid Prototying", in "The Future of Rapid Prototyping", Virtual Conference Center, Jul. 1998.

*Primary Examiner*—Leo B. Tentoni

[57] ABSTRACT

A freeform fabrication process and apparatus for making a colorful 3-D object. The process includes (1) operating a multiple-channel droplet deposition device for supplying and, on demand, ejecting droplets of multiple liquid compositions containing a solidifiable baseline body-building material and different colorants; (2) providing a support platform a distance from this deposition device to receive the droplets therefrom; and (3) during the droplet ejecting process, moving the deposition device and the platform relative to one another in an X-Y plane and in a Z direction orthogonal to the X-Y plane so that the droplets are deposited to form multiple layers to build a colorful 3-D object. These steps are executed under the control of a computer system by taking additional steps of (4) creating a geometry and color pattern of the object on a computer with the geometry including a plurality of color-coded segments defining the object; (5) generating programmed signals corresponding to each of the segments in a predetermined sequence; and (6) moving the deposition device and the platform relative to each other in response to these programmed signals. Preferably, the system is also operated to generate a support structure for any un-supported feature of the object.

31 Claims, 9 Drawing Sheets

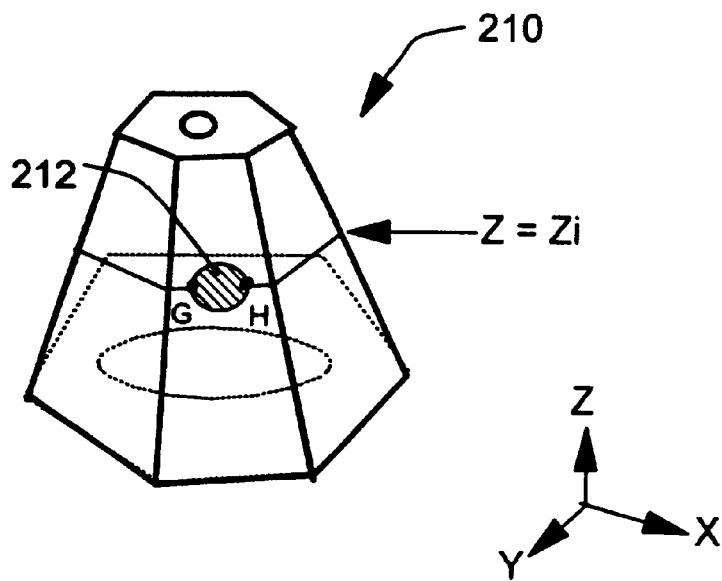
FIG.8(A)
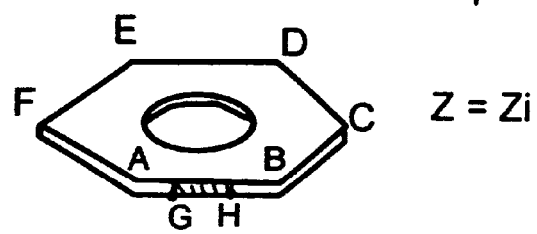
FIG.8(B)
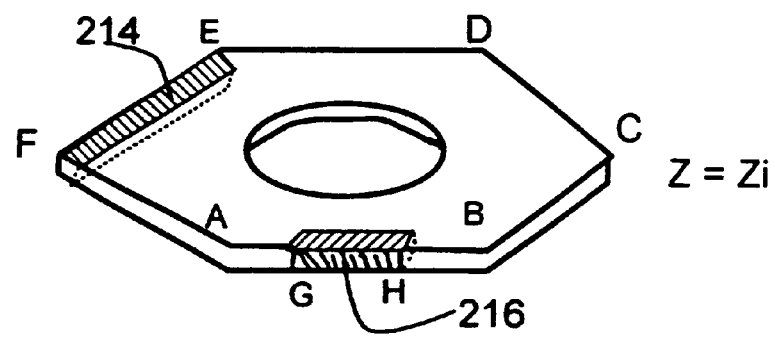
FIG.8(C)
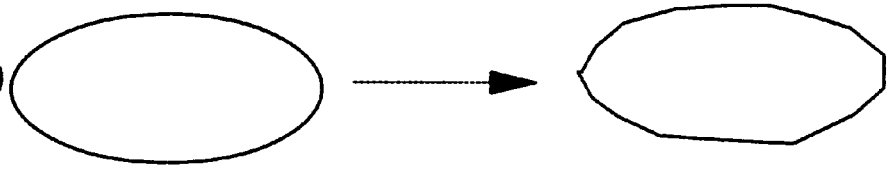
FIG.8(D)
FIG.8

3-D COLOR MODEL MAKING APPARATUS AND PROCESS

FIELD OF THE INVENTION

This invention relates generally to computer-controlled object-building processes and apparatus and, in particular, to processes and apparatus for building colorful models in a layer-by-layer fashion.

BACKGROUND OF THE INVENTION

As a new rapid prototyping (RP) technology, solid free-form fabrication (SFF) or layer manufacturing involves building a three-dimensional (3-D) object layer by layer or point by point. A SFF system quickly produces models and prototype parts from 3-D computer-aided design (CAD) geometry data, computed tomography (CT) scan data, magnetic resonance imaging (MRI) scan data, and model data created from 3-D object digitizing devices. A SFF system joins liquid, powder, and sheet materials point-by-point or layer-by-layer to form physical objects.

A typical SFF process normally begins with creating a Computer Aided Design (CAD) file to represent the geometry of a desired object using solid modeling software. In one commonly used approach, this CAD file is converted to a stereo lithography (.STL) format in which the exterior and interior surfaces of the object is approximated by a large number of triangular facets that are connected vertex-to-vertex. A triangular facet is represented by three vertex points each having three coordinates: $(x_1,y_1,z_1)$, $(x_2,y_2,z_2)$, and $(x_3,y_3,z_3)$. A perpendicular unit vector $(i,j,k)$ is also attached to each triangular facet to represent its normal for helping to differentiate between an exterior and an interior surface. This object geometry file is further sliced into a large number of thin layers with each layer being composed of a plurality of segments defined by many polygons. The layer data are converted to tool path data in terms of computer numerical control (CNC) codes or other similar machine control codes. These codes are then utilized to drive a fabrication tool for building an object point by point and/or layer by layer.

SFF technologies have been used to produce prototypes of injection-molded parts and metal castings that go into everything from mobile phones, computers, and copy machines to car instrument panels, aircraft subassemblies, and medical diagnostic instruments. SFF technologies may also be used in rapid tooling (RT). For instance, SFF-generated patterns are used to produce molds. Core and mold inserts can be produced directly from a digital database layer by layer. Use of SFF could reduce tool-making time and cost, and provide the opportunity to modify mold or die design without incurring high costs and lengthy time delays. SFF also has potential as a cost-effective production process if the number of parts needed at a given time is relatively small. Further, it can be used to fabricate certain parts with a complex geometry which otherwise could not be made by traditional fabrication approaches. SFF technologies produce freeform solid objects directly from a digital model without part-specific tooling or human intervention. The SFF-based RP technology has enjoyed a broad array of applications such as verifying CAD database, evaluating design feasibility, testing part functionality, assessing aesthetics, checking ergonomics of design, aiding in tool and fixture design, creating conceptual models and sales/marketing tools, generating patterns for investment casting, and reducing or eliminating engineering changes in production.

While in some of these applications, such as the verification of CAD design and testing of part functionality, the formation of a colorful object may not be essential, in other applications, such as aesthetics assessment, it may be desirable to have different colors on different parts of an object. Color is appreciated to be a strong communicator and no major mainstream media can function without it. A colorful prototype model can tell volumes about the nature of a design. There is a world of difference when it comes to the comparison between a color TV and a black-and-white TV, or between a color photo and a black-and-white photo. This notion suggests that a colorful prototype will convey much more to a viewer as compared to a single-color model.

Generally speaking, however, automated SFF techniques that are currently available for building 3-D parts do not provide adequate color manipulating capabilities. One commercially available system commonly referred to as stereo lithography (Sly), for instance, employs software to slice a computer generated solid model, represented by CAD data, into thin cross sections. The cross sections are then physically created by scanning a spot of ultraviolet laser light over the top surface of a reservoir of photo-curable liquid polymer. The scanned laser spot partially cures the polymer, changing it from a liquid to a solid. After forming a given layer an object platform that supports this first layer is lowered within the reservoir by an amount equal to the thickness of the layer created. A new layer of fresh polymer is re-coated over the previous layer and the scanning/curing process is repeated. These procedures are repeated for the next layers until the object is completed. After fabrication subsequent steps are required to drain the unused resin and to fully cure all of the photo polymer that may be trapped within the partially cured material. The SLy systems make use of single-color photo-curable polymers to make an object; each reservoir containing one type of single-color resin at a time. These systems do not provide the capability for the operator to vary the color of an object during the build process.

In another type of commercially available system, selective laser sintering (SLS), a thin layer of heat-fusible powder is spread over a surface by a counter rotating cylinder. A laser is employed to scan the powder layer, while its beam is modulated to melt the powder only in areas defined by the geometry of the cross section. A new layer of powder is then spread and melted, and the process is continually repeated until the part is completed. In each current SLS system, only one powder-feeding cylinder is permitted to operate during an object-building process even though, in principle, different cylinders may be used alternatively to feed powders of different colors for different layers. Even with several powder-feeding cylinders being available for one SLS system, however, this process is not capable of generating an object with different colors at different locations of a layer (unless, of course, the cylinders are able to feed different color powders to different spots of a layer; but, this is not presently possible).

Another commercially available system, fused deposition modeling (FDM), employs a heated nozzle to extrude a melted material such as nylon wire or wax. The starting material is in the form of a rod or filament that is driven to move like a piston. The front end, near the nozzle tip, of this piston is heated to become melted; the rear end or solid portion of this piston pushes the melted portion forward to exit through the nozzle tip. The nozzle is translated under the control of a computer system in accordance with previously sliced CAD data. The FDM technique was first disclosed in U.S. Pat. No. 5,121,329 (1992), entitled "Apparatus and Method for Creating Three-Dimensional Objects" issued to S. S. Crump. A most recent patent (U.S. Pat. No. 5,738,817, April 1998, to Danforth, et al.) reveals a fused deposition process for forming 3-D solid objects from a mixture of a particulate composition dispersed in a binder. The binder is later burned off with the remaining particulate composition densified by re-impregnation or high-temperature sintering. Commercially available FDM machines, each one being capable of feeding two types of filaments (one for the part being built and the other for the support structure), are not equipped for providing predetermined color pattern variations. Batchelder, et al. (U.S. Pat. No. 5,402,351, 1995 and U.S. Pat. No. 5,303,141, 1994) reveal a model generation system having closed-loop extrusion nozzle positioning. These melt extrusion based deposition systems provide only a fixed-composition feed and do not lend themselves to varying the color of an object.

It may be noted that all the SFF processes cited so far are related to making an object by depositing (adding) material to build individual layers (instead of removing un-wanted material from an otherwise full layer) and, hence, are commonly referred to as "layer-additive" processes.

In a series of U.S. patents (U.S. Pat. No. 5,204,055, April 1993, U.S. Pat. No. 5,340,656, August 1994, U.S. Pat. No. 5,387,380, February 1995, and U.S. Pat. No. 5,490,882, February 1996), Sachs, et al. disclose a 3-D printing technique that involves using an ink jet to spray a computer-defined pattern of liquid binder onto a layer of powder. The binder serves to bond together those powder particles on those areas defined by this pattern. Those powder particles in the un-wanted regions remain loose or separated from one another and will be removed at the end of the build process. Another layer of powder is spread over the preceding one, and the process is repeated. The "green" part made up of those bonded powder particles is separated from the loose powder when the process is completed. This procedure is followed by binder removal and metal melt impregnation or sintering. This process, as currently practiced, involves spraying single-color powder particles and single-color liquid binder to build all layers of an object and, therefore, does not provide an ability to build variable multi-color object.

In another series of U.S. Patents (U.S. Pat. No. 4,752,352, June 1998, U.S. Pat. No. 5,354,414, October 1994, U.S. Pat. No. 5,637,175, June 1997), Feygin reports a technique called laminated object manufacturing (LOM). In this technique, a material delivered in a thin sheet form, coated with thermally activated adhesive, is glued to the previous layer by use of a heated roller. A laser outlines a CAD-defined cross section onto the sheet and, in non-solid (unwanted) areas of the layer, it scribes a cross-hatch pattern of small squares. As the procedures repeat, the cross-hatches build up into "tiles" which are broken off the solid block and later removed to yield a finished part. This process represents a "layer-subtractive" process because each layer begins with supplying a full layer of sheet-like material and removing or subtracting the un-wanted portions of the layer. In the LOM methods currently being practiced, a continuous roll of paper of a uniform color (same color everywhere on the paper) is operated to build an object of single color. With the current LOM machines in operation, it would be difficult to alternately feed layers of different colors on demand and would be impossible to vary colors for different spots of a layer.

In U.S. Pat. No. 5,015,312, issued May 14, 1991, Kinzie discloses a method and apparatus for constructing a 3-D surface of predetermined shape and color from a length of sheet material. This method begins by making a series of color profiles along one side (not edge) of the sheet material in sequence. Each color profile corresponds in shape and color to the shape and color of a different cross section of the surface to be constructed. Areas on the sheet material outside of the profiles are then removed and discarded so as to leave a series of unconnected planar elements. Each planar element has an edge shape or outline corresponding to a crosssection of the surface with the color profile itself forming at least a color border or margin on the surface of its respective planar element around the edge. These individual planar elements are then glued together in a proper sequence to form a "laminated" structure. When viewed, the entire surface of this structure appears to be colored even though the color is applied only along one side (top or bottom surface, but not along the edges) of individual planar elements. This method does provide a variable multi-color exterior surface of an object. This layer-subtractive method, however, pays little attention to the formation of interior features (e.g., shape and dimension of a channel) of a 3-D object. A useful prototype requires the formation of more than just its outside surface. Further, the final stacking-up and lamination procedures must be carried out manually and the creation of color profiles on each layer is a lengthy procedure. Hence, this process is expected to be slow and labor intensive.

In U.S. Pat. No. 5,514,232, issued May 7, 1996 and U.S. Pat. No. 5,879,489, issued Mar. 9, 1999, Burns discloses a method and apparatus for automatic fabrication of a 3-D object from individual layers of fabrication material having a predetermined configuration. Each layer of fabrication material is first deposited on a carrier substrate in a deposition station. The fabrication material along with the substrate are then transferred to a stacker station. At this stacker station the individual layers are stacked together, with successive layers being affixed to each other and the substrate being removed after affixation. One advantage of this method is that the deposition station may permit deposition of layers with variable colors or material compositions. In real practice, however, transferring a delicate, not fully consolidated layer from one station to another would tend to shift the layer position and distort the layer shape. The removal of individual layers from their substrate also tends to inflict changes in layer shape and position with respect to a previous layer, leading to inaccuracy in the resulting part.

In U.S. Pat. No. 5,301,863 issued on Apr. 12, 1994, Prinz and Weiss disclose a Shape Deposition Manufacturing (SDM) system. The system contains a material deposition station and a plurality of processing stations (for mask making, heat treating, packaging, complementary material deposition, shot peening, cleaning, shaping, sand-blasting, and inspection). Each processing station performs a separate function such that when the functions are performed in series, a layer of an object is produced and is prepared for the deposition of the next layer. This system requires an article transfer apparatus, a robot arm, to repetitively move the object-supporting platform and any layers formed thereon out of the deposition station into one or more of the processing stations before returning to the deposition station for building the next layer. These additional operations in the processing stations tend to shift the relative position of the object with respect to the object platform. Further, the transfer apparatus may not precisely bring the object to its exact previous position. Hence, the subsequent layer may be deposited on an incorrect spot, thereby compromising part accuracy. The more processing stations that the growing object has to go through, the higher the chances are for the part accuracy to be lost. Such a complex and complicated process necessarily makes the over-all fabrication equipment bulky, heavy, expensive, and difficult to maintain. The equipment also requires attended operation.

In U.S. Pat. No. 4,665,492, issued May 12, 1987, entitled "Computer Automated Manufacturing Process and System" Masters teaches part fabrication by spraying liquid resin drops, a process commonly referred to as Ballistic Particle Modeling (BPM). The BPM process includes heating a supply of thermoplastic resin to above its melting point and pumping the liquid resin to a nozzle, which ejects small liquid droplets from different directions to deposit on a substrate. Commercial BPM machines are capable of jetting only low Tg thermoplastics such as wax, acrylonitrile-butadiene-styrene (ABS), high-impact polystyrene (HIPS), etc. Such a system with a single nozzle and single material supply does not permit fabrication of a multicolor object. BPM process is also further proposed in (1) W. E. Masters, "System and Method for Computer Automated Manufacture with Reduced Object Shape Distortion" U.S. Pat. No. 5,216,616, June 1993, (2) H. E. Menhennett and R. B. Brown, "Apparatus and Methods for Making 3-D Articles Using Bursts of Droplets," U.S. Pat. No. 5,555,176, September 1996, and (3) D. W. Gore, "Method for Producing a Freeform Solid-Phase Object from a Material in the Liquid Phase," U.S. Pat. No. 5,257,657, November 1993. In (3), Gore adapted the BPM technique for deposition of metal droplets. In a series of patents (U.S. Pat. No. 5,617,911, April 1997; U.S. Pat. No. 5,669,433, September 1997; U.S. Pat. No. 5,718,951, February 1998; and U.S. Pat. No. 5,746,844, May 1998.), Sterett, et al. disclosed a method and apparatus for building metal objects by supplying, aligning and depositing nearly uniform metal melt droplets. Metal droplet stream modeling was developed by Orme and Muntz (U.S. Pat. No. 5,340,090, August 1994; U.S. Pat. No. 5,259,593, November 1993; U.S. Pat. No. 5,226,948, July 1993; and U.S. Pat. No. 5,171,360, December 1992.). These metal droplet processes do not lend themselves for the fabrication of multi-color objects.

In U.S. Pat. No. 5,136,515, August 1992, Helinski proposed a RP process for producing a 3-D object layer by layer by jetting droplets of two different hardenable materials into the various layers with one material forming the object itself and the other forming a support for the object as necessary. In two follow-up patents (U.S. Pat. No. 5,506,607, April 1996 and 5,740,051, April 1998), Sanders, et al provided a more detailed description of this inkjet-based process. These three patents led to the development of commercial inkjet printing systems, e.g., Model Maker-II by Sanders Prototypes, Inc. These systems make use of wax and low-melting thermoplastic materials with the object being of one color and the support structure of another color. The process proposed by Yamane, et al. (U.S. Pat. No. 5,059,266, October 1991 and U.S. Pat. No. 5,140,937, August 1992.) involves jetting droplets of a thermosetting material from print-heads to a stage, which is used to mount a 3-D object being built. The print-head unit is positioned below the stage. The jetting direction and jetting amount of the material can be changed according to the geometry information of the object. This process is similar to BPM in that two or more printheads can be used to deposit materials from different orientations. A difference is that the printheads in the Yamane process are generally orientated upside-down so that the droplets are ejected generally upward. Due to no support structure, it is difficult for this upside-down inkjet process to build any object with features such as an overhang, an isolated island or any other non-selfsupporting corner. In addition, the prior-art processes disclosed in the above five patents ('515, '607, '051, '266, and '937) suffer from the following common shortcomings:

(1) Although these patents explicitly suggested or implicitly implied that different colors could be added to a 3-D object by using a plurality of nozzles to dispense materials containing different colors, they failed to fairly suggest how this could be effectively accomplished. Hitherto, this has not been a trivial task. This difficulty can be more easily understood if one recognizes the fact that a typical CAD file carries only geometry information but little or no information on material features such as color. For instance, the defacto standard format used in the RP industry is the .STL file format. As stated earlier, a .STL file is typically composed of a collection of triangular facets each being defined by three vertex points and one normal vector. The file does not contain any message on color. Based on a .STL file and the corresponding data of subsequently sliced layers, a fabrication tool (e.g., a print head) would not know when, where, and how to impart a desired color to a specific location of an intended 3-D object.

(2) Current inkjet printhead-based RP technologies are essentially limited to the fabrication of an object from low-melting thermoplastic materials or wax. These patents failed to suggest any realizable higher melting, higher molecular weight, or higher strength polymers that can effectively carry different dyes. How droplets of generally high-viscosity polymers containing different dyes could be properly mixed to achieve a broad range of colors in a 3-D object remains largely unexplored.

(3) These patents failed to recognize critical differences between traditional 2-D color inkjet printing and 3-D inkjet-based RP processes. For instance, 2-D printing involves ejecting dye-containing water onto a sheet of paper (normally a white color paper). To obtain any color, one simply operates an inkjet printhead to eject different proportions of yellow, cyan (or blue), and magenta (or red). Black spots are usually obtained by ejecting droplets of black ink, rather than by adding the three elemental colors together. The white color area is simply the area on a sheet of white paper where it receives no ink at all. In 3-D color inkjet printing, one would have to use a nozzle to dispense a white color base material or a white colorant-containing material. One no longer has a sheet of white paper for use as the background color.

Because the 2-D color printing technology is relatively well-advanced, it would be advantageous to integrate selected operational procedures and apparatus components for 2-D printing with those for 3-D solid freeform fabrication to constitute a 3-D color model making system.

Therefore, an object of the present invention is to provide a layer-additive process and apparatus for producing a multi-color 3-D object on a layer-by-layer basis.

It is a further object of the invention to provide a computer-controlled process and apparatus for fabricating a colorful 3-D object.

It is another object of the invention to provide a process and apparatus for building a CAD-defined object in which the color pattern can be predetermined.

A specific object of the invention is to integrate 2-D color printing operations with 3-D object building operations to produce multi-color objects.

SUMMARY OF THE INVENTION

The objects of the invention are realized by a process and related apparatus for fabricating a colorful three-dimensional object on a layer-by-layer basis and, preferably, under the control of a CAD computer.

One embodiment of this invention is an apparatus comprising:
(a) a droplet deposition device that comprises a multiplicity of flow channels with each channel being supplied with a solidifiable colorant-containing liquid composition. This deposition device further comprises at least one nozzle with each nozzle having, on one end, a fluid passage in fluid flow communication with one of these channels and, on another end, a discharge orifice;
(b) actuator means located in control relation to these channels for activating droplet ejection through the discharge orifice;
(c) a generally flat object-supporting platform in close, working proximity to the discharge orifice to receive liquid droplets therefrom;
(d) motion devices coupled to the platform and the deposition device for moving the deposition device and the platform relative to one another in an X-Y plane defined by first (or X-) direction and a second (or Y-) direction and in a third (or Z-)direction orthogonal to the X-Y plane to deposit the droplets into a three-dimensional object. The motion devices are controlled by a computer system for positioning the deposition device with respect to the platform in accordance with the CAD-generated data file representing the geometry and color pattern of a desired object.

The CAD computer with its supporting programs is capable of creating a geometry and color pattern of the object. The geometry is then sectioned into a desired number of layers with each layer being comprised of a plurality of segments represented by a collection of data points. Each segment also carries additional information on a selected color, which may be converted to control signals for activating desired channels thereby ejecting droplets of selected colors. These segments are arranged in a predetermined sequence. The motion devices, responsive to a CAD-defined data file, operate to provide relative translational motion of the droplet deposition device with respect to the object platform in a horizontal direction within the X-Y plane. The motion devices further provide relative movements vertically in the Z-direction, each time by a predetermined layer thickness.

The material in each supply of liquid composition may be comprised of, but is not limited to, one or more of the following materials including various adhesives, waxes, thermoplastic polymers, thermoset polymers, resins, metallic alloys, glasses, ceramics, epoxy resins, silicon adhesives, and combinations thereof. The material may also include combinations containing dissimilar materials added to impart a desired electrical, structural, or other functional characteristic to the material. Each composition also contains a color-making ingredient (referred to as a colorant or color ink), which may be a dye, pigment, color concentrate (commonly used in coloring of plastics), or combinations thereof.

One presently preferred material is a hot melt adhesive that exhibits a high adhesion to previously deposited material. The hot melt adhesive also exhibits good mixing characteristics with a variety of colorants. Another preferred material composition comprises ceramic, metallic, or polymeric particles, including a colorant, dispersed at a high volume content in water to make a paste. The composition in a paste form normally will not require heating to become a flowable state. In the cases where water content is too high, the part-building zone surrounding the platform may be pre-cooled to below the freezing temperature so that the discharged material may rapidly become solidified when in contact with a previous layer or a surface of the platform. A facilitated sublimation procedure may be followed to complete a "freeze-drying" process. Yet another preferred material composition comprises ceramic, metallic, or polymeric particles, including a colorant, dispersed in a fast vaporizing liquid to make a paste. The liquid may rapidly vaporize, optionally under the assistance of a pump means, to become solidified upon contact with a previous layer or a surface of the platform.

In one embodiment, the droplet deposition device is similar to a multi-channel printhead commonly used in an ink jet printer. The printhead is preferably equipped with heating means to maintain the colorant-carrying material compositions in a liquid state. Ink jet printheads can generally be divided into two types: one type using thermal energy to produce a vapor bubble in an ink-filled channel that expels a drop of ink while a second type using a piezoelectric transducer to produce a pressure pulse that expels a droplet from a nozzle. Droplets are dispensed through an orifice to deposit one layer onto the object-supporting platform. The procedure is continued to deposit a second layer that adheres to the first layer. This process is repeated until all the layers are deposited to form an object. The contour or cross section of each layer is pre-defined by the CAD-generated data file.

In one preferred embodiment, one of the multi-channels or a separate delivery tool may be employed to deliver and deposit a baseline material (e.g., a plastic melt or plastic-liquid paste) that will become the primary constituent material in the object. Such a baseline material is also referred to as a primary body-building material. A selected color ink is then mixed with this baseline material just prior to being deposited. Alternatively, the droplets of the baseline material may be deposited simultaneously or sequentially with the droplets of a color ink dispensed from a different channel. Different parts of a layer and different layers of an object may be built to show different colors.

Another embodiment of the presently invented apparatus contains a plurality of separate droplet deposition devices. In one version, one of the devices is used for depositing droplets of a baseline material while other devices for depositing droplets of selected color inks. To deposit a specific part of an object, one baseline material-depositing device and one color ink-depositing device may be operated simultaneously or sequentially. In another version, each device will be supplied with a necessary body-building material plus a colorant already well mixed together. At one time, only a deposition device is needed to operate for depositing a specific part of an object.

Yet another embodiment of the present invention is a process for building a colorful 3-D object in a layer-by-layer fashion that is executed under the control of a computer. The process comprises the steps of (a) operating a multiple-channel droplet deposition device for supplying multiple liquid compositions containing different colorants and ejecting the liquid compositions in the form of droplets on demand; (b) providing an object-supporting platform in a close working vicinity of the droplet deposition device to receive the droplets therefrom; and (c) during the droplet ejecting process, moving the deposition device and the object platform relative to one another in an X-Y plane defined by a first and second directions and in a third or Z direction orthogonal to the X-Y plane to form the liquid droplets into a three dimensional object.

This moving step includes the steps of (i) moving the deposition device and the platform relative to one another in a direction parallel to the X-Y plane to form a first layer of the materials on the platform; (ii) moving the deposition device and the platform away from one another by a predetermined layer thickness; and (iii) after the portion of the first layer adjacent to the nozzle has solidified, dispensing a second layer of the fluid onto the first layer while simultaneously moving the platform and the deposition device relative to one another in a direction parallel to the X-Y plane, whereby the second layer solidifies and adheres to the first layer.

Additional steps are then taken for forming multiple layers of the materials on top of one another by repeated dispensing of the droplets from the deposition device as the platform and the device are moved relative to one another in a direction parallel to the X-Y plane, with the device and the platform being moved away from one another in the Z-direction by a predetermined layer thickness after each preceding layer has been formed, and with the dispensing of each successive layer being controlled to take place after the material in the preceding layer immediately adjacent the deposition device has solidified.

The above cited steps (a) through (c) are further combined with the steps of (f) creating a geometry and color pattern of the object on a computer with the geometry being sliced into a plurality of segments defining the object; (g) generating programmed signals corresponding to each of the segments in a predetermined sequence; and (h) moving the deposition device and the platform relative to one another in response to the programmed signals. Each segment is attached with a color code that can be converted to programmed signals for activating the ejection of selected inks to form the desired color pattern of the finished object. Preferably, the supporting software programs in the computer comprise means for evaluating the CAD data files of the object to locate any un-supported feature of the object and means for defining a support structure for the un-supported feature. The software is also capable of creating a plurality of segments defining the support structure and generating programmed signals required by the same deposition device or a separate fabrication tool to fabricate the support structure.

Additional embodiments of the presently invented processes involve the steps of (A) operating a plurality of droplet deposition devices with each device being supplied with different liquid compositions containing different colorants and ejecting the liquid compositions in the form of droplets on demand. All other procedures are similar to those specified for the above cases of operating a multi-channel deposition device. Again, one device may be employed to deposit primarily droplets of a baseline materials with other devices being responsible for depositing primarily droplets of selected color inks. Again, alternatively, each device may be used to deposit a mixture of a baseline material and a selected colorant. The details of these processes and related apparatus are described in what follows.

In order to take advantage of existing 2-D color printing technology, another embodiment of the present invention is an apparatus for making a multi-color three-dimensional object, comprising:

(1) a droplet dispensing device for providing a bulk of the materials needed to build the object on a layer-by-layer basis.

(2) a 2-D printing device for delivering desired inks to desired locations of the object. This printing device may comprise a majority of the components commonly found in a 2-D inkjet printer, excluding the paper feeding and transporting mechanism. This printer comprises primarily a cartridge that carries four print heads (for yellow, cyan, magenta, and black inks, respectively). The cartridge is driven by a first motion device (e.g., a motor and drive belt) to move horizontally in an X-direction (perpendicular to the paper movement direction in a conventional 2-D color printer).

(3) a computer and supporting software programs operative to create a three-dimensional geometry and color pattern of a desired object, to convert the geometry into a plurality of segments defining the object with each segment coded with a color, and to generate programmed signals corresponding to each of said segments in a predetermined sequence. The data on color pattern is used to drive the 2-D color printer and the data on geometry is used to drive the droplet deposition device and related motion devices;

(4) an object-supporting platform in close, working proximity to the dispensing devices to receive liquid droplets therefrom;

(5) a second motion device (e.g., a 3-D gantry table) coupled to the platform and the droplet dispensing device for moving the dispensing device and the platform relative to one another in an X-Y plane defined by the X and Y directions and in a third or Z direction orthogonal to the X-Y plane to deposit the droplets into a three-dimensional object; and (6) a three-dimensional machine controller electronically linked to the computer and the first and second motion devices and operative to actuate the motion devices in response to the programmed signals.

A further embodiment is a method for making a multi-color 3-D object on a layer-by-layer basis, comprising:

(a) providing a computer and supporting software programs operative to create a three-dimensional geometry and a color pattern of a desired object and to convert the geometry and color pattern data into programmed signals in a predetermined sequence;

(b) providing an object-supporting platform with a generally flat surface;

(c) responsive to the programmed signals, operating at least one droplet dispensing device for depositing droplets of a baseline body-building material to build a portion of a first layer of the object onto the flat surface of the platform;

(d) further responsive to the programmed signals, operating a 2-D color printing device for depositing desired color inks onto this portion of this first layer;

(e) repeating (c) and (d) to complete the formation of the first layer; and (f) repeating (c), (d), and (e) to build multiple layers of the object. Alternatively, step (c) is operated to build a complete layer, upon which color dyes are then deposited to form a complete color pattern on this layer of body-building material by operating step (d).

BRIEF DESCRIPTION OF THE DRAWINGS

FIG. 8 (A) a 3-D object with a blue color circle 212 on one surface, (B) The object is sliced at Z=Zi to form a 2.5-D layer, (C) segment OH (216) inherited a blue color code from circle 212, (D) a circle is approximated by a polyline in a 2.5D layer format (such as Common Layer Interface, CLI).

DESCRIPTION OF THE PREFERRED EMBODIMENTS

Figure 1:
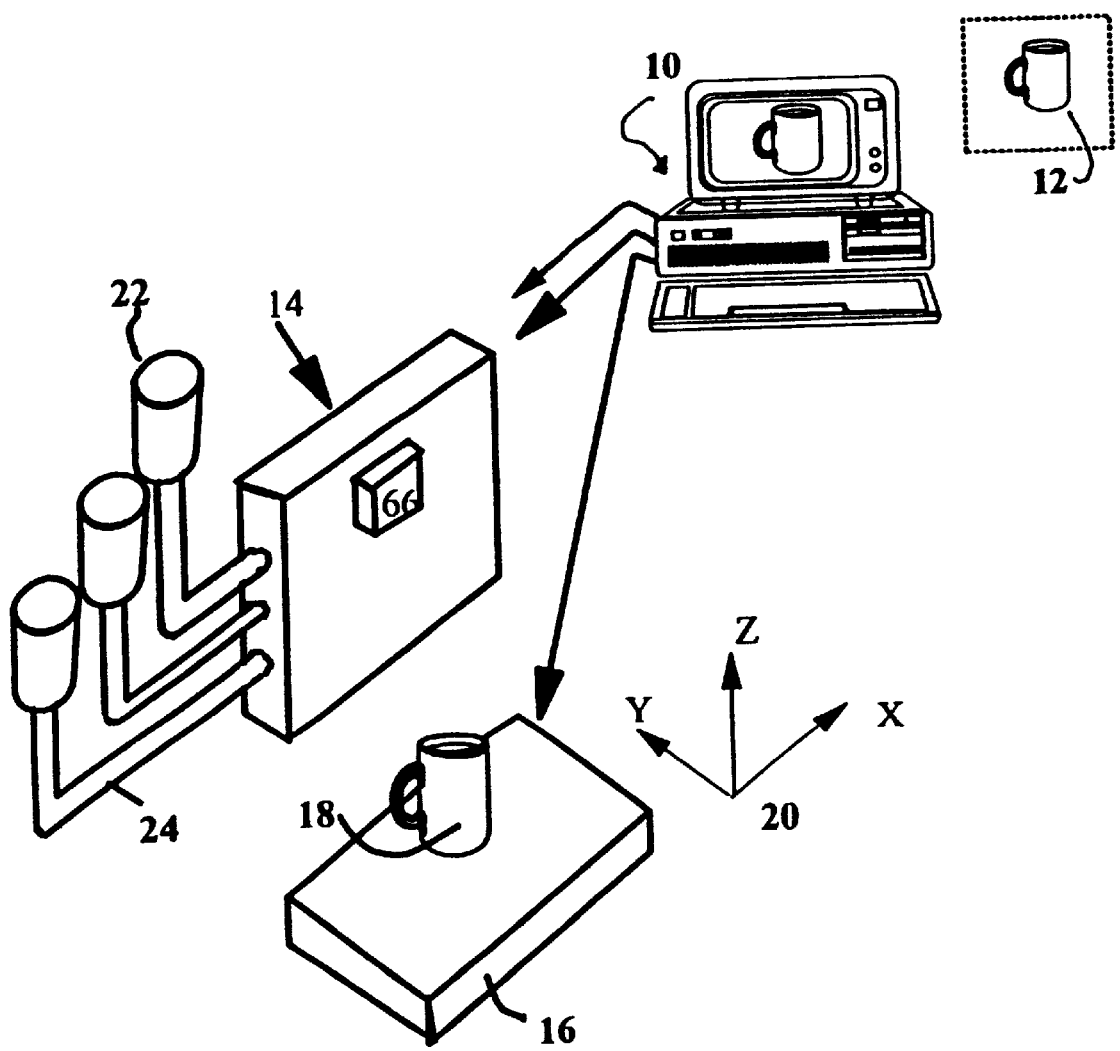
FIG. 1 Schematic of an apparatus for building a color 3-D object on a layer-by-layer basis, comprising a multi-channel droplet deposition device, an object-supporting platform capable of moving in an X-Y plane and in an orthogonal Z-axis in a desired sequence, and a computer control system.

In the drawings, like parts have been endowed with the same numerical references.

Apparatus:

FIG. 1 illustrates one embodiment of the apparatus of this invention for making colorful three-dimensional objects. This apparatus is equipped with a computer 10 for creating a geometry 12 and color pattern of an object and for controlling the operation of other components of the apparatus. These other components include a multiple-channel droplet deposition device 14, an object-supporting platform 16, optional temperature-regulating means (not shown) and pump means (not shown) to control the atmosphere of a zone surrounding the platform where a part 18 is being built, and a three dimensional movement system (an example given in FIG. 5) to position the platform 16 with respect to the deposition device 14 in a direction on an X-Y plane and in a Z-direction as defined by the rectangular coordinate system 20 shown in FIG. 1.

There are a broad array of droplet deposition devices that can be incorporated in the presently invented apparatus. One type of deposition devices is a thermal ink jet printhead. A device of this type operates by using thermal energy selectively produced by resistors located in capillary filled ink channels near channel terminating orifices to vaporize momentarily the ink and form bubbles on demand. Each temporary bubble expels an ink droplet and propels it toward the object platform. The following patents all teach about the configurations of thermally activated printheads: U.S. Pat. No. 4,571,599 to Rezanka, U.S. Pat. No. 4,463,359 to Ayata, et al., and U.S. Pat. No. 4,829,324 to Drake, et al.

Another useful droplet deposition device is a piezoelectric activated ink jet printhead that uses a pulse generator to provide an electric signal. The signal is applied across piezoelectric crystal plates, one of which contracts and the other of which expands, thereby causing the plate assembly to deflect toward a pressure chamber. This causes a decrease in volume which imparts sufficient kinetic energy to the ink in the printhead nozzle so that one ink droplet is ejected through an orifice. Examples of piezoelectric activated ink jet printheads may be found in U.S. Pat. No. 4,549,191 to Fukuchi and Ushioda, U.S. Pat. No. 4,584,590 to Fishbeck and Wright, U.S. Pat. No. 4,887,100 to Michaelis, U.S. Pat. No. 5016,028 to Temple, U.S. Pat. No. 5,065,170 to Rezanka, and U.S. Pat. No. 5,402,162 to Fusting.

Figure 2A:
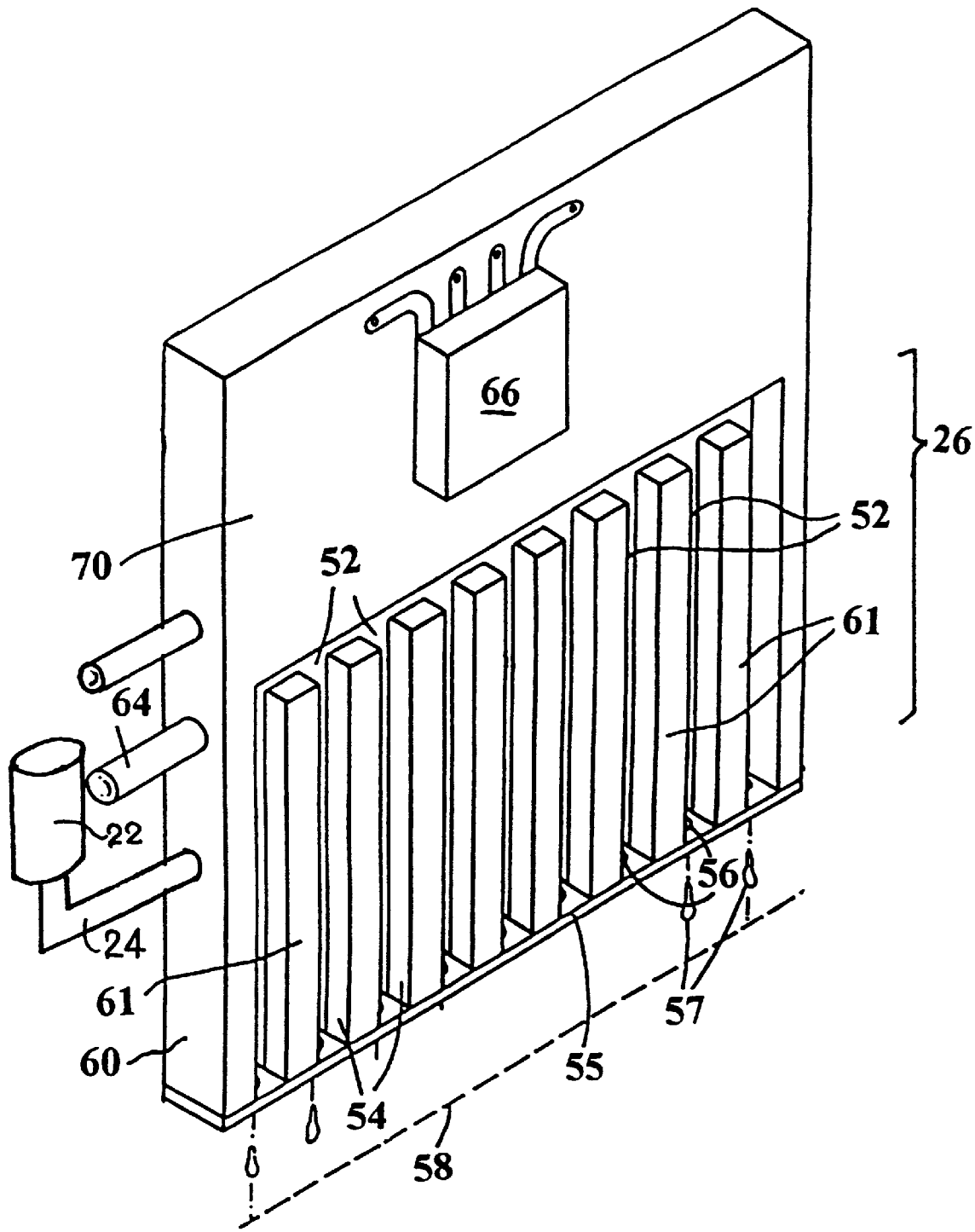
FIG. 2 (a) Schematic of an example of a piezo-electrically actuated multi-channel ink jet printhead for depositing droplets of a colorant-containing liquid. (b) Bottom view of the same printhead as in (a). (c) A sectional view of the same printhead.
Figure 2C:
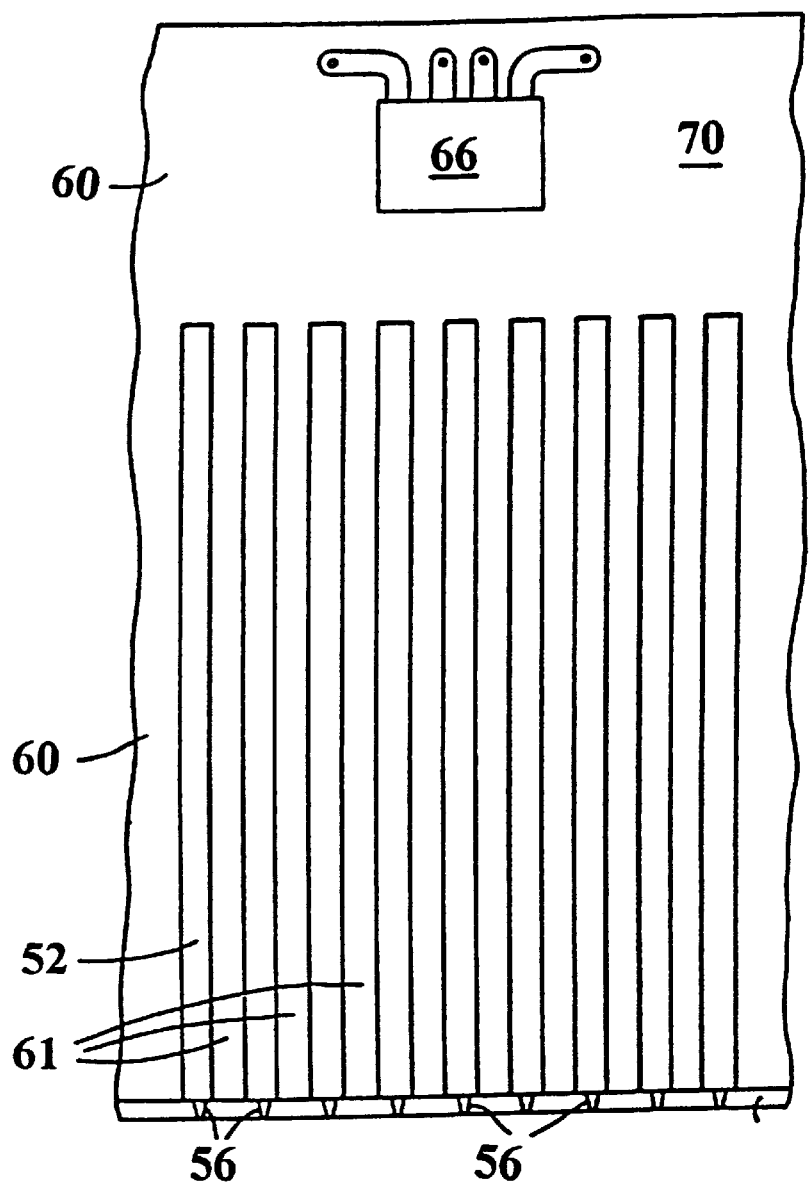
Figure 2B:
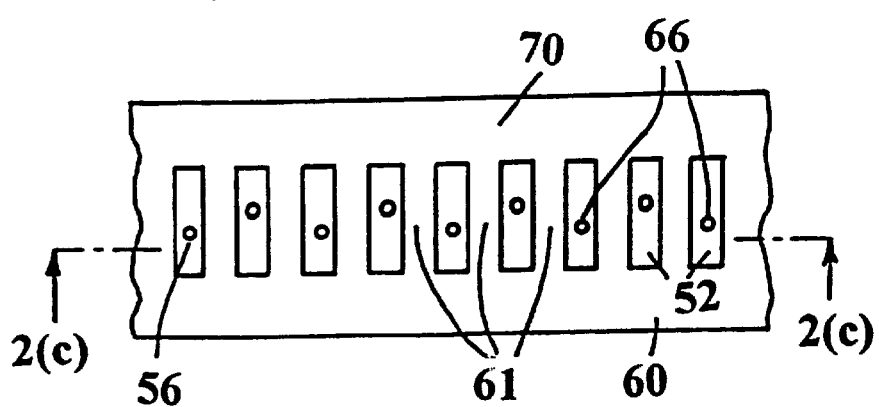

An example of a piezo-electric activated ink jet printhead 14 is shown in FIGS. 1 and 2. This droplet deposition device 14 is a planar high-density array, drop-on-demand inkjet printhead, comprising a printhead body 60 formed with a multiplicity of parallel ink channels 52, nine only of which are shown and the longitudinal axes of which are disposed in a plane. The channels 52 contain liquid compositions 54 and terminate at corresponding ends thereof in a nozzle plate 55 in which are formed orifices 56, one for each channel. Ink droplets 57 are ejected on demand from the channels 52 and deposited on selected spots of a print line 58 on a previous layer of an object or a surface of the object platform.

The printhead body 60 has a planar base part 70 in which the channels 52 are cut or otherwise formed so as to extend in parallel rearwardly from the nozzle plate 55. The channels 52 are long and narrow with a rectangular cross section and have opposite side walls 61 which extend the length of the channels. The side walls 61 are displaceable transversely relative to the channels axes along substantially the whole of the length thereof, as later described, to cause changes of pressure in the liquid composition in the channels to produce droplet ejection from the orifices 56. Each of the channels 52 connects at its end remote from the orifice, with a transverse channel (not shown) which in turn connects with a liquid supplying reservoir 22 by way of pipe means 24 or 64. Electrical connections (not shown) for activating the channel side walls 61 are made to a silicon chip 66 on the base part 70. Reservoirs 22 are there to receive liquids containing a baseline material and several different colorants. The droplet deposition device as illustrated in FIG. 2 is similar to what is disclosed in U.S. Pat. No. 4,887,100. The differences include the notions that the present device shown in FIG. 2 contains separate reservoirs and pipes that supply different liquid compositions and that one of the liquid compositions comprises a baseline material for building the body of the object.

One reservoir may be allowed to supply a baseline material; i.e., a primary body-building material that constitutes the object. Other reservoirs serve to feed different colorants. The baseline material-feeding channel and at least one colorant-feeding channel may be operated to eject their respective droplets simultaneously or sequentially for building a portion of an object at a time. Alternatively, the liquid in each reservoir may contain a baseline material and a colorant. At least one channel containing both a baseline material and a colorant is allowed to operate for building a portion of the object at a time.

An alternative embodiment of the presently invented apparatus may comprise a plurality of droplet deposition devices, each having only one or two channels. In a two-channel device, one channel may be used to deposit a baseline material while the other a color ink. In a working set of several deposition devices, at least one of the channels must be sued to deposit a liquid composition that contains a baseline material; other channels may contain only liquid colorants. Alternatively, all channels may feed a mixture of a baseline material and a selected colorant.

Preferably, a portion of the deposition device is provided with temperature-controlled means (not shown) to ensure the material remain in a flowable state while residing in a reservoir, pipe, or channel prior to being dispensed. Heating and cooling means (e.g., heating elements, cooling coils, thermocouple, and temperature controller; not shown) may be provided to a region surrounding the platform 16 to control the solidification behavior of the material on the platform.

Figure 5:
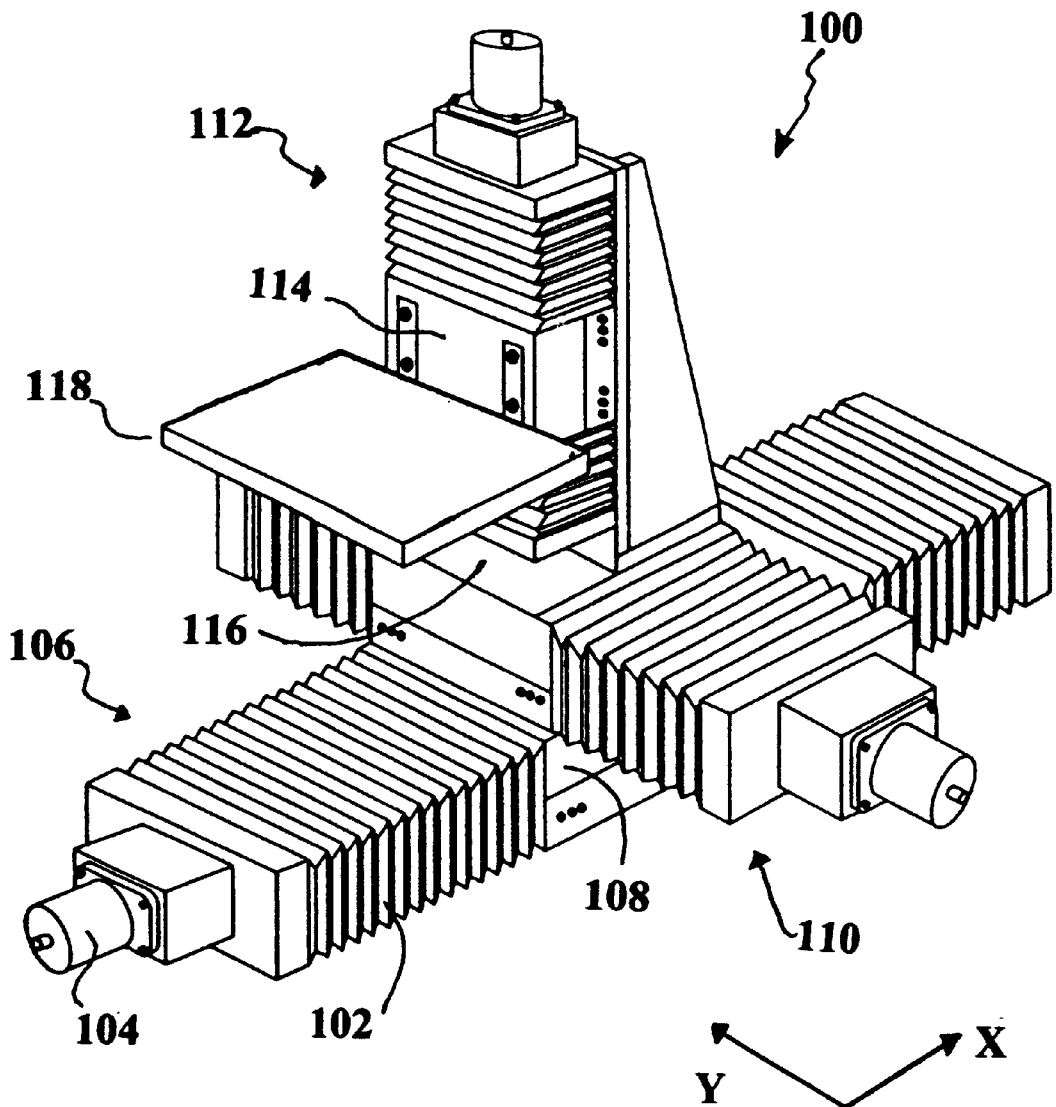
FIG. 5 A possible X-Y-Z positioning stage (prior art).

Referring again to FIG. 1, the object platform 16 is located in close, working proximity to the dispensing nozzle 26. The upper surface of the platform preferably has a flat region sufficiently large to accommodate the first few layers of the deposited material. The platform 16 and the deposition device 14 are equipped with mechanical drive means for moving the platform relative to the deposition device in three dimensions along the X-, Y-, and Z-axes in a rectangular coordinate system in a predetermined sequence and pattern, and for displacing the nozzle a predetermined incremental distance relative to the platform. This can be accomplished, for instance, by allowing the platform 16 to be driven by three linear motion devices, which are powered by three stepper motors to provide movements along the X-, Y-, and Z-directions, respectively. FIG. 5 presents an example of a X-Y-Z positioning stage 100, which is composed of three linear motion devices 106, 110, 112. Each linear motion device is composed of drive screws (inside a protective cove 102, e.g.), driven by a motor (e.g., 104), and a carriage (e.g., 108). In this configuration, the object platform 118 is fastened to a carriage 114 of a Z-directional linear motion device 112. This device 112 is fastened to a carriage 116 of a Y-directional linear motion device 110, which is in turn fastened to a carriage 108 of an X-directional linear motion device 106. Motor means are preferably high resolution reversible stepper motors, although other types of drive motors may be used, including linear motors, servomotors, synchronous motors, D.C. motors, and fluid motors. Mechanical drive means including linear motion devices, motors, and gantry type positioning stages are well known in the art.

Z-axis movements are executed to displace the platform 16 relative to the deposition device 14 or to displace the deposition device relative to the platform and, hence, relative to each layer deposited prior to the start of the formation of each successive layer. In one possible arrangement, the deposition device may be mounted in a known fashion for movement in the X-Y plane, with the platform 16 supported for separate movement toward and away from the deposition device along the Z-direction. Alternatively, the platform may be supported for movement in the X-Y plane, with the deposition device mounted for separate movement along the Z-direction toward and away from the platform. Another alternative is to have the movements in the X-Y plane and in the Z-direction all to be carried out by either the platform only or by the deposition device only. It will be understood that movement in the X-Y plane need not be limited to movement in orthogonal directions, but may include movement in radial, tangential, arcuate and other directions in the X-Y plane.

These movements will make it possible for the deposition device to deposit and form multiple layers of colorant-containing materials of predetermined thickness, which build up on one another sequentially as the material solidifies after discharge from the orifice. The rate at which the droplets are discharged from the discharge orifice onto the platform is dictated by the frequency of the piezo-electric pulses and the orifice size. This rate can be adjusted, by varying the pulse signal generating speed, to meet the possible needs of variable rate at which the nozzle moves with respect to the platform.

Another embodiment of the present invention is an apparatus comprising a multiplicity of droplet deposition devices. However, at least one separate deposition device is supplied with a low-melting material (e.g., a wax) so that this nozzle is operative to discharge and build a support structure for any un-supported feature in the three-dimensional object being built. Un-supported features in an object include isolated islands, overhangs, and some suspended members of the object. There are many commercially available metering and dispensing nozzles that are capable of depositing wax and various resins such as epoxy and polyurethane. Examples include various two-component dispensing devices such as PosiDot® from Liquid Control Corp. (7576 Freedom Ave., North Canton, Ohio) and Series 1125 Meter-Mix-Dispense systems from Ashby-Cross Company, Inc. (28 Parker Street, Newburyport, Mass.). Any of such prior art dispensing nozzles can be incorporated as a part of the presently invented apparatus to deposit a resin- or wax-based support structure when and where needed.

In order to take advantage of existing 2-D color printing technology, another embodiment of the present invention is an apparatus that involves integration of selected 2-D color printer components and 3-D body-building equipment. As an example, referring to FIG. 4, this apparatus comprises:

(1) a droplet dispensing device 84 for providing a bulk of the materials needed to build the body of an object 98. This droplet dispenser is supplied, through a pipe means 86, with a liquid composition that contains a primary body-building material.

(2) a 2-D printing device 120 for delivering desired inks to desired locations of the object. This printing device may comprise a majority of the components commonly found in a 2-D inkjet printer, excluding the paper feeding and transporting mechanism. This printer comprises primarily a cartridge 82 that carries four print heads (for yellow, cyan, magenta, and black inks, respectively). Either heating (in a bubble jet printer) or exciting voltage signals (in a piezo-electric ceramic based inkjet printer) are transmitted from a computer through a flexible cable 88 to the respective nozzles being held by the cartridge 82. The cartridge is driven by a first motion device (e.g., a motor 90 and drive belt 80) to move horizontally in an X-direction (perpendicular to the paper movement direction in a conventional 2-D color printer). An optional movement device (not shown) may be provided to move the 2-D inkjet printer in the Y-direction. The droplet dispenser 84 may be attached to the cartridge 82 and, therefore, driven by the same set of motion devices 80, 90. Alternatively, this dispenser may be driven by a separate positioning device. It may be chosen to remain stationary provided the object platform is allowed to move in X, Y, and Z directions.

(3) a computer and supporting software programs operative to create a three-dimensional geometry and color pattern of a desired object, to convert the geometry into a plurality of segments defining the object, and to generate programmed signals corresponding to each of said segments in a predetermined sequence. The data on geometry is used to drive the droplet deposition device and related motion devices to build multiple layers of an object. The data on color pattern is used to drive the 2-D color printer for selectively ejecting color inks to the surface of these layers on a point-by-point or layer-by-layer basis.

(4) an object-supporting platform 96 in close, working proximity to the dispensing devices to receive liquid droplets therefrom;

(5) a second motion device (e.g., a 3-D gantry table 100) coupled to the platform 96 for moving the platform relative the dispensing device in an X-Y plane and in the Z direction orthogonal to the X-Y plane to deposit the droplets into a three-dimensional object 98. This second motion device may be an X-Y-Z positioning stage, as shown in FIG. 5. It may simply be a Y-Z positioning table provided that the cartridge 82 and the body-building material dispenser 84 are allowed to move at least in the X direction.

(6) a three-dimensional machine controller electronically linked to the computer and the first and second motion devices and operative to actuate the motion devices in response to the programmed signals.

Preferably, a sturdy base 92 is provided to support the 2-D inkjet printer 120. This base preferably has an object build chamber 94 with a controlled atmosphere. Optionally, a second droplet dispensing device may be added to build support structures as needed.

Materials:

In FIG. 1, the liquid compositions do not have to be in a melt state. A water-soluble material such as poly (ethylene oxide) may be allowed to mix with a predetermined amount of water to form a flowable solution or paste. Some materials (e.g., plaster and starch) may be dispersed, but not completely dissolved, in water or another type of non-toxic liquid. These types of materials may also be fed into the reservoirs along with water or a proper liquid to make a paste. This fluid may also be mixed with a selected colorant, preferably in liquid or fine powder form to form an ejectable liquid composition.

The discharged fluid that comes in contact with the object platform or a previous layer must meet two conditions. The first condition is that this material must have a sufficiently high viscosity to prevent excessive flow when being deposited; this is required in order to achieve good dimensional accuracy. The second condition is that the newly discharged material must be able to adhere to a previous layer. These two conditions can be met by discharging the following types of materials under the respectively specified condition:

Type I: A ceramic, metallic, wax, or semi-crystalline polymer material must be maintained at a temperature above its melting point just before being discharged. The object platform and the previous layers must be maintained at a temperature lower than its melting temperature. The portion of the previous layer facing the deposition device must have been solidified before the new material is brought in contact with this portion of the previous layer. Examples of semi-crystalline polymers are polyamide (or nylon), poly (ethylene terephthalate) (PET), and polypropylene (PP).

Type II: A non-crystalline material such as glass (e.g., boro-silicate glass and soda-lime-silica glass) and amorphous thermoplastic polymer material must be maintained at a temperature slightly above its glass transition temperature just before being discharged. The object platform and the previous layers must be maintained at a temperature lower than its glass transition temperature. The portion of the previous layer facing the nozzle must have been solidified before the new material is brought in contact with this portion of the previous layer. Examples of substantially amorphous thermoplastic polymers are polystyrene (PS), acrylonitrile-butadiene-styrene copolymer (ABS), poly methyl methacrylate (PMMA), and poly carbonate (PC).

Type III: A liquid-soluble material (e.g., water soluble polymer) must be maintained at a solution state with a high solute content (low percentage of liquid). The object platform and the previous layers must be maintained at a temperature lower than (preferably much lower than) the freezing temperature of the liquid so that the new material when brought in contact with a previous layer is rapidly frozen. Upon completion of the object-building procedure, the frozen object is then subjected to a vacuum environment, or under a pumping condition, to promote sublimation of the "solvent" component (i.e., the "liquid" component now in its solid state). This is essentially a freeze-drying procedure well known in the food processing industry. Upon completion of this freeze-drying procedure, the object will be highly porous and may be impregnated with a material such as a wax or epoxy resin for improved integrity.

Type IV: A solid material (e.g., fine ceramic, metallic, or polymeric powder) that can be dispersed (mixed but not dissolved) in a liquid is made into a paste of proper viscosity and preferably of high solid content. Preferably, the liquid is a fast vaporizing one such as ethanol, methanol, and acetone; a non-toxic material (e.g., alcohol) having a high vapor pressure at room temperature is most desirable. The part-building zone surrounding the object platform is preferably under a vacuum or pumping condition to promote vaporization of the liquid, rapidly leaving behind the solid. A lower temperature environment may be desired for reduced flowability of the paste. Alternatively, a freeze-drying procedure may be followed to remove the liquid component.

Type V: A fast-curing thermosetting resin (e.g., a two-part epoxy) may be maintained in an oligomer state prior to being discharged. As soon as being dispensed, the resin will rapidly gel to an extent that the glass transition temperature of this reacting resin quickly approaches or exceeds the object platform environment temperature, thereby solidifying the resin. The gelation process of selected resins, e.g., some photo curable epoxy resins commonly used in stereo lithography, may be further accelerated by exposing the deposited resin to an ultraviolet beam. Fast curing resins are well known in the art and several formulations are commercially available.

Type VI: A sol-gel material (e.g., a polymer gel composed of a lightly cross-linked network of chains with small molecules occupying interstices between these chains) can be formulated to have proper flowability prior to being discharged from a nozzle. The gelation process of the material when brought in contact with the object platform or a previous layer may be rapidly advanced further to increase its viscosity to facilitate solidification. A variety of natural polymer powders, such as lotus root and corn starch, may be well dispersed in warm water to produce paste for being readily transported to a deposition device. Additional water at a higher temperature is then added just prior to the discharging step to activate the fast gelation process. The new material will naturally glue to a previous layer, yet will not flow to any significant extent in this highly gelled state. Synthetical polymers such as polyacrylamide also has exhibited a similar behavior and has been found to successfully make a 3-D gel object.

Figure 4:
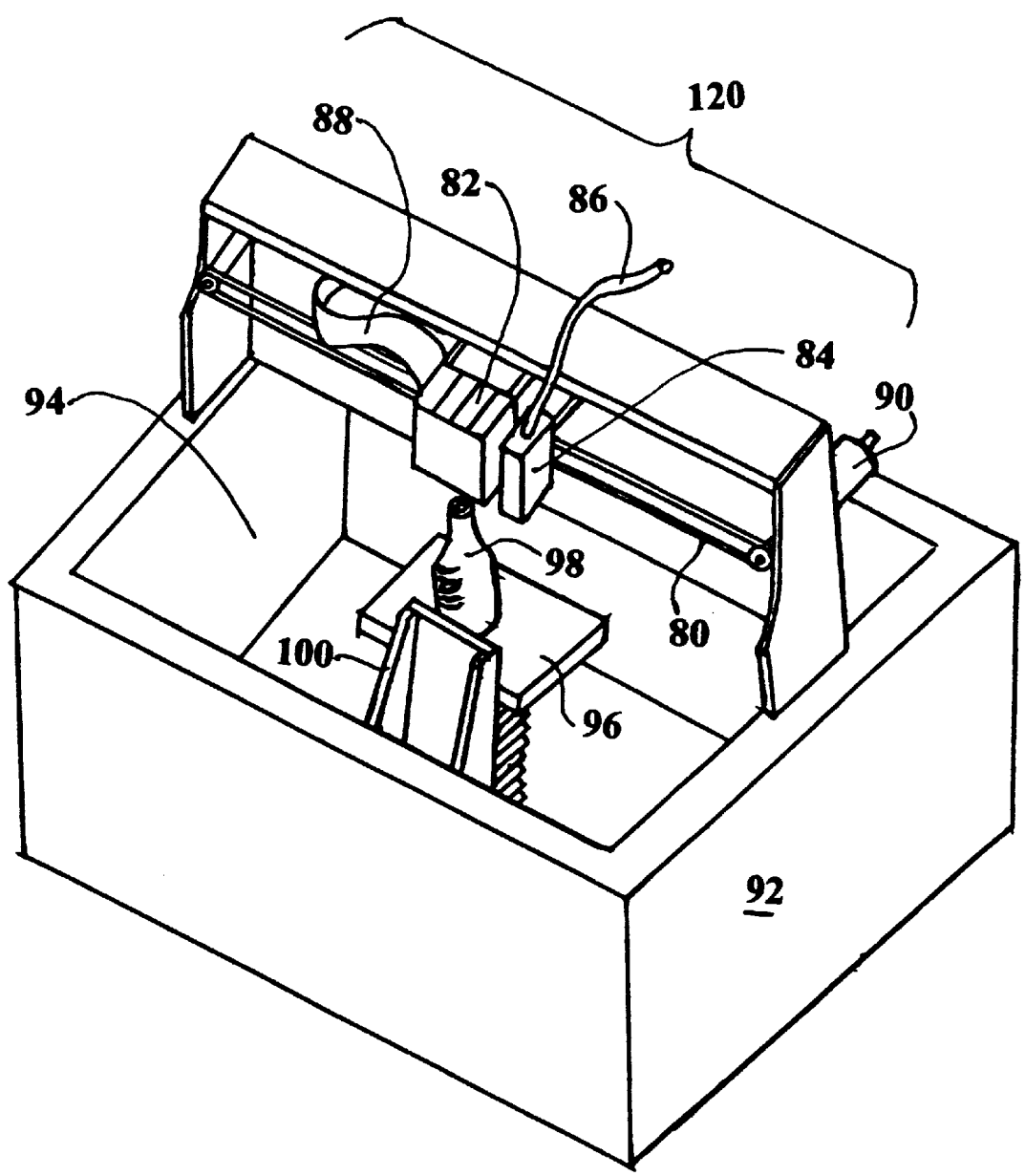
FIG. 4 A schematic of a 3-D color model maker comprising a 2-D color printer and a 3-D body building machine.

For the apparatus shown in FIG. 4, the body-building material that feeds into the droplet dispenser 84 may be selected from Type I through Type VI. The selection of a material is preferably based on its surface compatibility with the ink used. A majority ingredient of an ink composition commonly used in 2-D inkjet printing is water, which is either rapidly absorbed by paper (being made up of cellulosic fibers and containing surface porosity) or vaporized. In the present 3-D printing technology, vaporization of water may be promoted by heating and/or pumping the object build chamber 94. Rapidly vaporizing liquid such as alcohol or acetone may be used to replace water as the dye-suspending medium.

Figure 3:
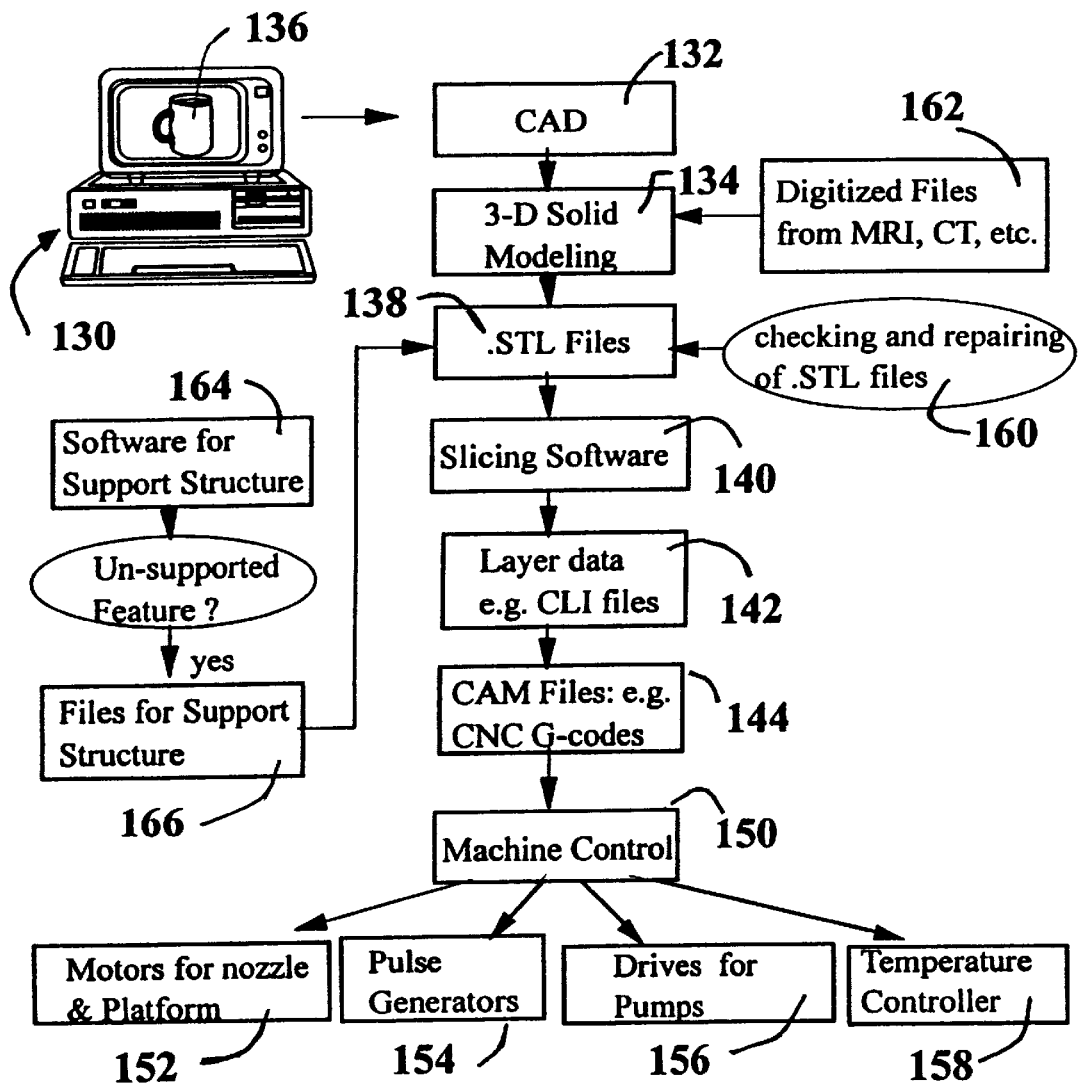
FIG. 3 Computer-aided design (CAD) computer and required software programs for creating an image of the object being built, for optionally generating data files for support structures, and for controlling various components of the 3-D color object building apparatus.

Computer and Software:

A preferred embodiment of the present invention contains at least one multi-channel droplet deposition device or at least two separate deposition devices as described earlier in this section, but further comprising a computer-aided design (CAD) computer 10 or 130 and a machine controller 150. As schematically shown in FIG. 3, the CAD computer with its supporting software programs 132,134 operates to create a three-dimensional geometry of a desired object 136 or model and to convert the geometry into multiple elevation layer data 142, each layer being composed of a plurality of segments.

In a typical SFF process, the geometry of a 3-D object 136 is converted into a proper format 138 utilizing commercially available CAD/Solid Modeling software 132,134. A commonly used format is the stereo lithography file (.STL), which has become a defacto industry standard for rapid prototyping. The object geometry data is then sectioned into multiple layers by a software program 140 which is commercially available. Each layer has its own shape and dimensions. These layers, each being composed of a plurality of segments, when combined together, will reproduce the complete geometry of the intended object. For instance, a 3-D object 210 is schematically shown in FIG. 8A. Mathematically, by letting Z=Zi, one obtains a layer as shown in FIG. 8B, which is defined by an exterior contour (polyline A-B-C-D-E-F-A), an interior contour polyline (a circle may be approximated by a polyline, FIG. 8D), and a layer thickness. Line segment EF, for instance, with a finite width and a finite thickness actually represents a small segment of volume (shaded volume element 214 in FIG. 8C). Because a droplet has a finite volume, a chain of contiguous droplets may be deposited to form such a volume element. Each sliced layer may be represented by a cluster of segments organized in a desired sequence. A nozzle may be used to trace out all the segments that constitute a layer. It is desirable that these segments are sorted in accordance with their colors. However, prior art .STL format and practically all CAD/Solid Modeling geometry formats carry little or no information on colors.

Feature-based Annotations: The prior art geometry representation is limited to a uniform-composition object only. When a multi-color object is desired, the data format may be extended to include an annotation to specify a color.

Figure 6:
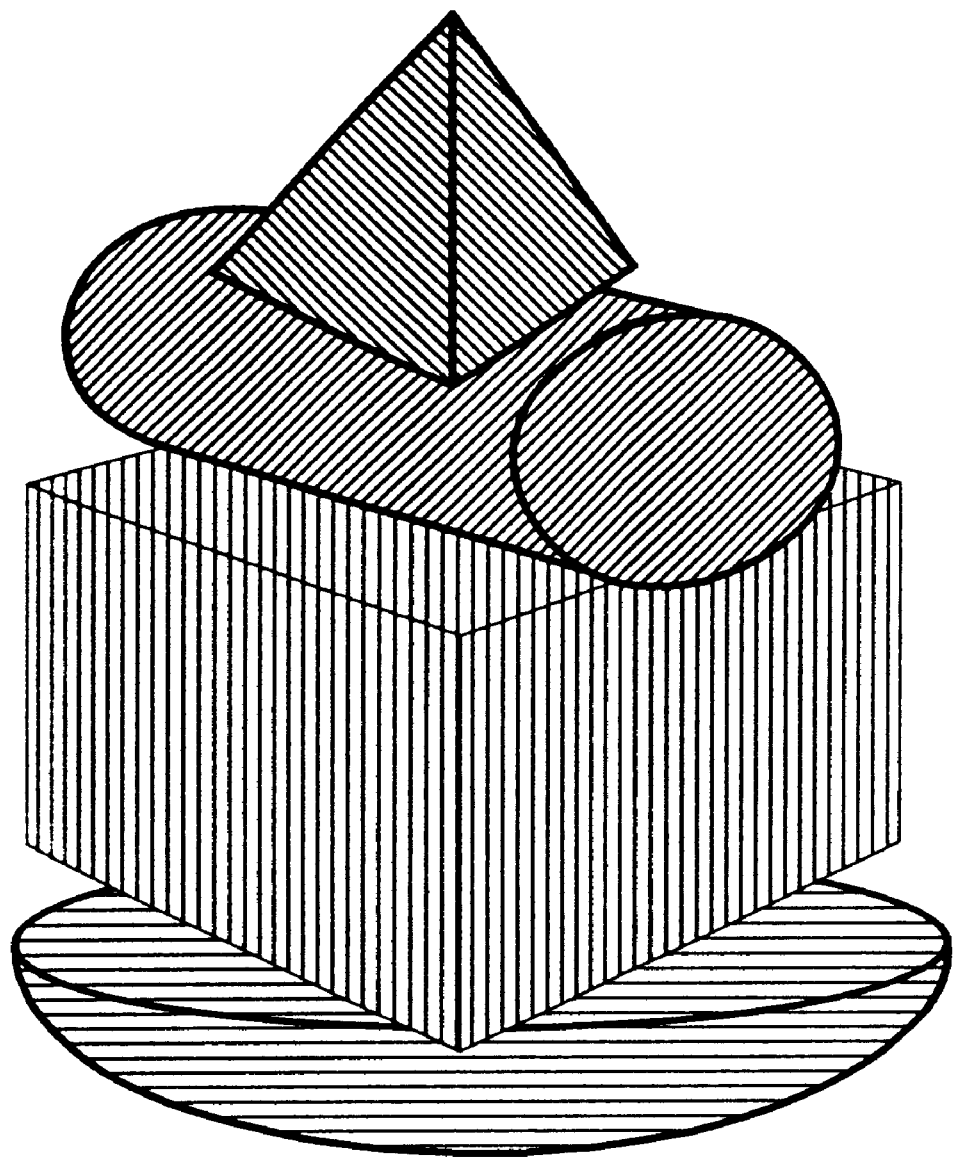
FIG. 6 An object with a simple color pattern.

If an object is composed of several parts that are distinct in color (simple color pattern), these individual parts will be conferred with distinct material features (colors) in the design stage (e.g., FIG. 6). In attempting to express the CAD model in terms of a .STL format, the triangles may be so chosen that each set of triangles covers one and only one color. In a conventional .STL file, each triangular facet is represented by three vertex points $(x_1,y_1,z_1)$, $(x_2,y_2,z_2)$, and $(x_3,y_3,z_3)$ plus a unit normal vector (i,j,k). In the presently used extended format, each facet is now further endowed with a color code. During the slicing step, neighboring data points with the same material feature code on the same layer can be sorted together. For instance, referring to FIG. 8A again, a blue color circular area 212 is sliced through to form a segment bounded by points G and H. This segment GH in FIG. 8C defines a volume element 216, which may endowed with a color (code C for cyan). All other segments are endowed with a white color (code W). These segments are then converted into a file (for selecting deposition tools and tool paths) in a proper format, such as the standard G- and M-codes commonly used in computerized numerical control (CNC) machines. This layering data may be directed to a machine controller to deposit selected materials to predetermined spots by (1) selecting the desired material dispensing devices (e.g., desired channels of an inkjet print head according to specific color codes), (2) selectively actuating the motors for moving the dispensing devices with respect to the object-supporting platform, and (3) activating signal generators, driving the valve means in material dispensing devices, powering an optional vacuum pump, and operating temperature controllers.

Figure 7:
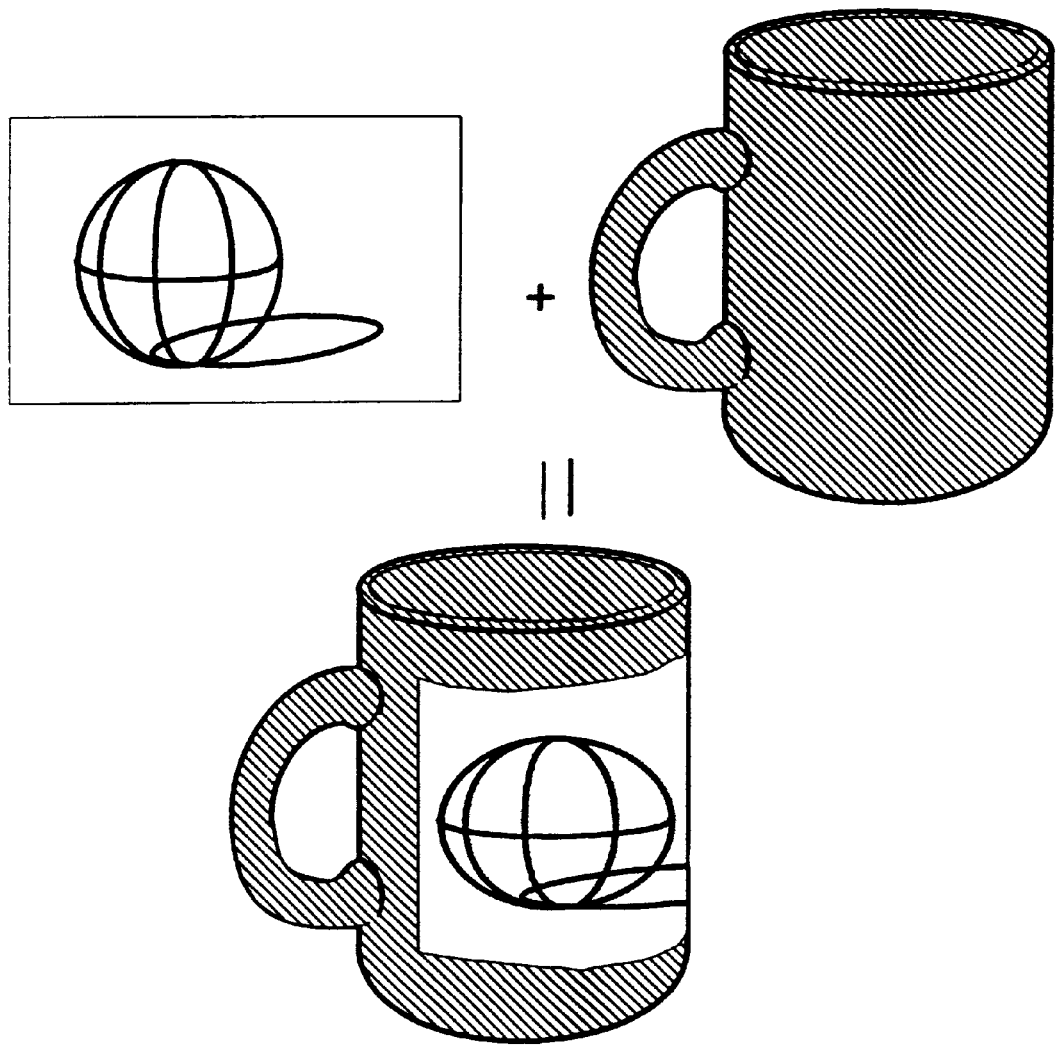
FIG. 7 A 2-D color image is mapped onto a 3-D object.

When a complex color pattern is to be imparted to the surface of an object, a 2-D to 3-D geometrical mapping will be needed. The original color pattern can be represented in a 2-D bitmap (or, more precisely, a pixmap). The array index of each pixel indicates its location in the pixmap. The 2-D color pattern will then be projected onto the targeted 3-D surface area of the object, much like pasting a flexible color picture onto, and in conformity with, the surface profile of the object (e.g., FIG. 7). During this projection, the color code of the original pattern pixel is passed to its corresponding pixel on the destination surface. If one-to-one correspondence is not possible, elimination, duplication, and/or interpolation may be adopted to provide the best results. When the object is either directly sliced, or tessellated to become a .STL file and then transformed into a contour file, the color code will always stay with an individual pixel and become part of the contour file. The feature (color) code will be recognized by a tool path planning program and converted into a proper CNC M-code to specify a proper deposition tool (e.g., an inkjet print-head channel) for dispensing the selected color and material. If the size of the contour file becomes too large, conventional image compression approaches may be used to reduce the memory requirement.

If the change of material and/or color composition of an object is gradual, i.e., no distinct regions or sub-components can be identified, the material/color composition can be represented in a feature function, M(x, y, z). Function M(x, y, z) indicates the material feature (color) requirement at location (x, y, z). While the geometry of the object can be represented by the triangular facet approximation, the material feature requirements can be expressed independently. This independence can be useful in representing, for example, the varying physical properties from the inside surface to the outside surface of the object. When the object is either directly sliced or tessellated to become a .STL file, additional computation is needed to compute the feature code for each pixel.

It should be noted that although the .STL file format has been emphasized in this approach, many other file formats have been employed in different commercial rapid prototyping and manufacturing systems. These file formats may be used in the presently developed geometry projection system and each of the constituent segments for the object geometry may be assigned a color code. Similarly, if an object of different material compositions in different locations is desired, each segment may also be coded with a specific material composition.

In a specific approach, the triangles in a .STL file must be so chosen that each covers one and only one color. Each facet is now further endowed with a color code. During the slicing step, neighboring data points with the same color code on the same layer may be sorted together. These segment data are then converted into programmed signals (data for selecting a tool and a tool path) in a proper format, such as the standard NC G-codes and M-codes 144 for computerized numerical control (CNC) machinery industry. These layering data signals may be directed to a machine controller 150 which selectively actuates selected nozzle channels, powers the motors for moving the deposition device with respect to the object-supporting platform 152, activates the pulse generators 154, drives the optional vacuum pump means 156, and operates optional temperature controllers 158.

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages 160 may be utilized to check and repair .STL files which are known to often have gaps, defects, etc. AUTOLISP can be used to convert AUTOCAD drawings into multiple layers of specific patterns and dimensions.

Several software packages specifically written for rapid prototyping have become commercially available. These include (1) SOLIDVIEW RP/MASTER software from Solid Concepts, Inc., Valencia, Calif.; (2) MAGICS RP software from Materialise, Inc., Belgium; and (3) RAPID PROTOTYPING MODULE (RPM) software from Imageware, Ann Arbor, Mich. These packages are capable of accepting, checking, repairing, displaying, and slicing .STL files for use in a solid freeform fabrication system. These and other software packages 164 (e.g.

Bridgeworks from Solid Concepts, Inc.) are also available for identifying an un-supported feature in the object and for generating data files 166 that can be used to build a support structure for the un-supported feature. The support structure may be built by a separate fabrication tool or by the same deposition device that is used to build the object.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI) 162, etc. These digitizing techniques are known in the art. The digitized data may be re-constructed to form a 3-D model 134 on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

The three-dimensional motion controller 150 is electronically linked to the mechanical drive means and is operative to actuate the mechanical drive means in response to "X" "Y" "Z" axis drive signals for each layer received from the CAD computer. Controllers that are capable of driving linear motion devices are commonplace. Examples include those commonly used in a milling machine.

Process:

Another embodiment of the present invention is a solid freeform fabrication process for building a colorful 3-D object in a layer-by-layer fashion. The process comprises the steps of (1) operating a multiple-channel droplet deposition device for supplying multiple liquid compositions containing different colorants and ejecting the liquid compositions in the form of droplets on demand; (2) providing an object-supporting platform in a close working vicinity of the droplet deposition device to receive the droplets therefrom; and (3) during the droplet ejecting process, moving the deposition device and the object platform relative to one another in an X-Y plane defined by a first and second directions and in a third or Z direction orthogonal to the X-Y plane to form the liquid droplets into a three dimensional object.

The moving step includes the steps of (a) moving the deposition device and the platform relative to one another in a direction parallel to the X-Y plane to form a first layer of the materials on the object platform; (b) moving the nozzle and the platform away from each other by a predetermined layer thickness; and (c) after the portion of the first layer adjacent to the nozzle has solidified, dispensing a second layer of the liquid droplets onto the first layer while simultaneously moving the platform and the deposition device relative to one another in a direction parallel to the X-Y plane, whereby the second layer solidifies and adheres to the first layer.

The process further comprises additional steps of forming multiple layers of the materials on top of one another by repeated dispensing of droplets from the deposition device as the platform and the deposition device are moved relative to one another in a direction parallel to the X-Y plane, with the deposition device and the platform being moved away from one another in the Z-direction by a predetermined layer thickness after each preceding layer has been formed, and with the dispensing of each successive layer being controlled to take place after the material in the preceding layer immediately adjacent the nozzle has solidified. These steps are accomplished by operating the apparatus described above under the control of a computer system.

The process further comprises the steps of (d) creating a geometry and color pattern of the 3-D object on a computer with the geometry including a plurality of segments defining the object and each segments is endowed with a color code; (f) generating programmed signals corresponding to each of these segments in a predetermined sequence; and (g) moving the deposition device and the platform relative to one another in response to the programmed signals. These additional steps provide computerized control over the relative motions between the deposition device and the platform to build a 3-D object. When the computer reads a specific code, during the object building process, it will send out proper control signals to select the correct channels for ejecting droplets of selected colorants.

As indicated earlier, the most popular file format used by all commercial rapid prototyping machines is the .STL format. The .STL file format describes a CAD model's surface topology as a single surface represented by triangular facets. By slicing through the CAD model simulated by these triangles, one would obtain coordinate points that define the boundaries of each cross section. It is therefore convenient for a dispensing nozzle to follow these coordinate points to trace out the perimeters of a layer cross section. These perimeters may be built with a proper color pattern and, since the exterior colors are normally what a person sees, the color patterns of the perimeters of constituent layer cross sections are normally more important than those of the interior of an object. These considerations have led to the development of another embodiment of the present invention. This is a process as set forth in the above-cited three steps, (1) through (3), wherein the moving step includes the step of moving the deposition device and the platform relative to one another in a direction parallel to the X-Y plane according to a first predetermined pattern to form an outer boundary of one color or one pattern of different colors onto the platform. The outer boundary defines an exterior surface of the object.

Another embodiment is a process as set forth in the above paragraph, wherein the outer boundary defines an interior space in the object, and the moving step further includes the step of moving the deposition device and the platform relative to one another in one direction parallel to the X-Y plane according to at least one other predetermined pattern to fill this interior space with at least one of the liquid materials. The interior does not have to have the same color as the exterior boundary. This process may further comprise the steps of (h) creating a geometry and color pattern of the object on a computer with the geometry including a plurality of color-coded segments defining the object; (j) generating program signals corresponding to each of these segments in a predetermined sequence, wherein the program signals determine the movement of the deposition device and the platform relative to one another in the first predetermined pattern and at least one other predetermined pattern; (l) activating at least two colorant-containing channels to eject mixtures of droplets onto an object-supporting platform; and (n) during this dispensing step, moving the deposition device and the object-supporting platform in response to the programmed signals relative to one another in the X-Y plane and in the Z-direction in a predetermined sequence of movements such that the droplets are dispensed in free space as a plurality of segments sequentially formed so that the last dispensed segment overlies at least a portion of the preceding segment in contact therewith to thereby form the object.

In the above-cited processes, there may be provided at least three compositions containing yellow, magenta, and cyan, respectively. Preferably, there may be further provided one composition containing black colorant. Still further preferably, one additional composition contains a white colorant is provided so that an object can contain white-color portion. In 2-D color printing, white color portion of an image is provided by the white color background where no ink is deposited. In the present 3-D color printing, a white color-containing material composition is highly desirable. In another embodiment, at least one composition is an optically transparent material.

Preferably, the process further includes steps of (m) evaluating the data files representing the object to locate any un-supported feature of the object, (n) defining a support structure for the un-supported feature and creating a plurality of segments defining the support structure, (p) generating program signals corresponding to each of these constituent segments for the support structure (in addition to those for the object being built) in a predetermined sequence; (q) providing at least one liquid composition for building the support structure (in addition to building the object, sequentially and/or concurrently).

A further embodiment of the present invention is a method for making a multi-color 3-D object on a layer-by-layer basis, comprising:

(a) providing a computer and supporting software programs operative to create a three-dimensional geometry and a color pattern of a desired object (and, preferably, also operative to identify un-supported features of the object and to generate support structure files) and to convert the geometry and color pattern data into programmed signals in a predetermined sequence;

(b) providing an object-supporting platform with a generally flat surface;

(c) responsive to the programmed signals, operating at least one droplet dispensing device for depositing droplets of a baseline body-building material to build a portion of a first layer of the object onto the flat surface of the platform (and, when necessary, build a first layer of a support structure);

(d) further responsive to the programmed signals, operating a 2-D color printing device for depositing desired color inks onto this portion of this first layer;

(e) repeating (c) and (d) to complete the formation of the first layer of the object (and a layer of a support structure where necessary); and (f) repeating (c), (d), and (e) to build multiple layers of the object.

Specifically, the process, for instance, may include first building a first portion of a first layer with a baseline body-building material. The surface of this first portion is then deposited with a selected color pattern. A second portion of this first layer is then built with the same body-building material or, possibly with a different material if a second droplet dispenser or a second channel of a dispenser is available. A second color pattern is then imparted to the surface of this second portion of the first layer. The colors of individual portions are determined by their respective color codes. These procedures are repeated until the first layer is completed. A second layer, single- or multiple-colored as desired, is then built by following a similar set of procedures. The procedures are continued until multiple layers, with each layer possibly having a different color form, are completed to build a colorful object. It may be noted that "a portion" could mean just a few droplets of a body-building material. Desired color inks are dispensed essentially simultaneously to mix with this portion of an object. In other words, the cartridge 82 may be positioned to deposit a few droplets of ink immediately after a few droplets of a body-building material are ejected from the dispenser 84. Clearly, the apparatus as herein specified can be adapted to readily accomplish the above procedures.

What is claimed:

1. Apparatus for making a multi-color three-dimensional object on a layer-by-layer basis, comprising:

a droplet deposition device comprising:

a multiplicity of flow channels; at least one of said channels containing a solidifiable liquid composition as a body-building baseline material for said object and at least one of said channels containing a colorant; each channel having on one side a discharge orifice of a predetermined size;

a multiplicity of liquid reservoirs; each of said reservoirs having on one side a pipe means in fluid flow communication with one of said channels at another side of said channel remote from said orifice;

actuator means located in control relation to each of said channels for actuating ejection of droplets through said discharge orifice;

an object-supporting platform disposed underneath and at a predetermined initial distance from said discharge orifices to receive liquid droplets therefrom;

motion means coupled to said platform and said deposition device for moving said deposition device and said platform relative to one another in a plane defined by first and second directions and in a third direction orthogonal to said plane to deposit said droplets into a three-dimensional object;

a computer-aided design computer and supporting software programs operative to create a three-dimensional geometry and color pattern data of a desired object, to convert said geometry into a plurality of segments defining the object with each segment coded with a color, and to generate programmed signals corresponding to each of said segments in a predetermined sequence; and a three-dimensional motion controller electronically linked to said motion means and operative to actuate said motion means in response to said programmed signals for each of said segments received from said computer.

2. Apparatus as set forth in claim 1, wherein said droplet deposition device comprises an ink jet printhead with thermally activated actuator means.

3. Apparatus as set forth in claim 1, wherein said droplet deposition device comprises an ink jet printhead with piezoelectric activated actuator means.

4. Apparatus as set forth in claim 1, wherein said supporting software programs comprise:
   means for evaluating the data files representing the geometry of said object to locate any un-supported feature of the object;
   means, responsive to the evaluating means locating an un-supported feature, for defining a support structure for said un-supported feature;
   means for creating a plurality of segments defining said support structure; and
   means for generating programmed signals required by said droplet deposition device to fabricate said support structure.

5. Apparatus as set forth in claim 1, further comprising a separate fabrication tool and wherein said supporting software programs comprise:
   means for evaluating the data files representing the image of said object to locate any un-supported feature of said object;
   means, responsive to the evaluating means locating an un-supported feature, for defining a support structure for the un-supported feature;
   means for creating a plurality of segments defining said support structure; and
   means for generating programmed signals required by said separate fabrication tool to fabricate said support structure.

6. Apparatus for making a multi-color three-dimensional object on a layer-by-layer basis, comprising:
   a plurality of droplet deposition devices; each of said devices having at least a channel being supplied with a liquid composition from a liquid reservoir through a pipe means, actuator means in control relation to said channel for droplet ejection, and a discharge orifice at one end of said channel to eject liquid droplets therethrough; at least one of said liquid compositions containing a solidifiable body-building baseline material for said object and at least one of said liquid compositions containing a colorant;
   an object-supporting platform disposed underneath and at a predetermined initial distance from said discharge orifices to receive liquid droplets therefrom;
   motion means coupled to said object platform and said deposition devices for moving said deposition devices and said object platform relative to one another in a plane defined by first and second directions and in a third direction orthogonal to said plane to deposit said liquid droplets for forming a three-dimensional object;
   a computer-aided design computer and supporting software programs operative to create a three-dimensional geometry and color pattern data of a desired object, to convert said geometry into a plurality of segments defining the object with each segment being coded with a color, and to generate programmed signals corresponding to each of said segments in a predetermined sequence; and
   a three-dimensional motion controller electronically linked to said motion means and operative to actuate said motion means in response to said programmed signals for each said segment received from said computer.

7. Apparatus asset forth in claim 6, wherein said supporting software programs comprise:
   means for evaluating the data files representing the image of said object to locate any un-supported feature of the object;
   means, responsive to the evaluating means locating an un-supported feature, for defining a support structure for said un-supported feature;
   means for creating a plurality of segments defining said support structure; and
   means for generating programmed signals required by said droplet deposition device to fabricate said support structure.

8. Apparatus as set forth in claim 7, further comprising a separate fabrication tool and wherein said supporting software programs comprise:
   means for evaluating the data files representing the image of said object to locate any un-supported feature of said object;
   means, responsive to the evaluating means locating an un-supported feature, for defining a support structure for the un-supported feature;
   means for creating a plurality of segments defining said support structure; and
   means for generating programmed signals required by said separate fabrication tool to fabricate said support structure.

9. A solid freeform fabrication process for making a colorful three-dimensional object comprising the steps of:
   creating a geometry and color pattern of an object on a computer with said geometry including a plurality of segments defining the object; each of said segments being coded with a color;
   generating programmed signals corresponding to each of said segments in a predetermined sequence;
   operating, in response to said programmed signals, a multiple-channel droplet deposition device for supplying desired multiple liquid compositions and ejecting said liquid compositions in the form of droplets on demand; at least one of said liquid compositions containing a solidifiable baseline body-building material and at least two of said liquid compositions containing different colorants;
   providing an object-supporting platform disposed underneath and at a predetermined initial distance from said droplet deposition device to receive said droplets therefrom;
   during said droplet ejecting process and in response to said programmed signals, moving said deposition device and said object platform relative to one another in a plane defined by a first and second directions and in a third direction orthogonal to said plane to form a first layer of said droplet compositions on said platform;
   moving said deposition device and said platform away from one another in said third direction by a predetermined layer thickness;
   after the portion of said first layer adjacent to said deposition device has solidified, dispensing a second layer of said droplet compositions onto said first layer while simultaneously moving said platform and said deposition device relative to one another in a direction parallel to said plane, whereby said second layer solidifies and adheres to said first layer;
   operating additional steps of forming multiple layers of said droplet compositions on top of one another by repeated ejecting and depositing of said droplet compositions from said deposition device as said platform and said deposition device are moved relative to one another in said direction parallel to said plane, with said deposition device and said platform being moved away from one another in said third direction by a predetermined layer thickness after each preceding layer has been formed and with the depositing of each successive layer being controlled to take place after said materials in the preceding layer immediately adjacent said deposition device have substantially solidified to form a colorful three-dimensional object.

10. A process as set forth in claim 9, wherein said moving step includes the step of moving said deposition device and said platform relative to one another in a direction parallel to said plane according to a first predetermined pattern to form an outer boundary from at least one of said droplet compositions containing desired colorants on said platform, said outer boundary defining an exterior surface of said object.

11. A process as set forth in claim 10, wherein said outer boundary defines an interior space in said object, and said moving step further includes the step of moving said deposition device and said platform relative to one another in one direction parallel to said plane according to at least one other predetermined pattern to fill said interior space with at least one of said droplet compositions.

12. A process as set forth in claim 11, wherein said program signals determine said movement of said deposition device and said platform relative to one another in said first predetermined pattern and said at least one other predetermined pattern.

13. A process as set forth in claim 9, comprising additional steps of evaluating the geometry data files representing said object to locate any un-supported feature of the object, defining a support structure for the un-supported feature and creating a plurality of segments defining said support structure;

generating program signals corresponding to each of the segments for said object and each of the segments for said support structure in a predetermined sequence;

providing at least two colorant-containing liquid compositions for said object and one liquid composition for said support structure;

feeding said compositions to at least one droplet deposition device and operating said at least one deposition device to eject droplets of said compositions onto an object-supporting platform; and during said ejection step, moving said deposition device and said object-supporting platform in response to said programmed signals relative to one another in a plane defined by first and second directions and in a third direction orthogonal to said plane in a predetermined sequence of movements such that said compositions are deposited in free space as a plurality of segments sequentially formed so that the last deposited segment overlies at least a portion of the preceding segment in contact therewith to thereby form said support structure and said three-dimensional object.

14. A solid freeform fabrication process for making a colorful three-dimensional object comprising the steps of:

creating a geometry and color pattern of an object on a computer with said geometry including a plurality of segments defining the object; each of said segments being coded with a color;

generating programmed signals corresponding to each of said segments in a predetermined sequence;

operating, in response to said programmed signals, a plurality of droplet deposition devices for supplying desired multiple liquid compositions and ejecting droplets of said liquid compositions; each of said devices having at least a channel being supplied at one end with a liquid composition from a liquid reservoir through a pipe means, actuator means in control relation to said channel for droplet ejection, and a discharge orifice at another end of said channel to eject liquid droplets therethrough; at least one of said liquid compositions containing a solidifiable body-building baseline material for said object and at least one of said liquid compositions containing a colorant;

providing an object-supporting platform disposed underneath and at a predetermined initial distance said droplet deposition device to receive said droplets therefrom;

during said droplet ejecting process and in response to said programmed signals, moving said deposition devices and said object platform relative to one another in a plane defined by a first and second directions and in a third direction orthogonal to said plane to form a first layer of said droplet compositions on said platform;

moving said deposition devices and said platform away from one another in said third direction by a predetermined layer thickness;

after the portion of said first layer adjacent to said deposition devices has solidified, dispensing a second layer of said droplet compositions onto said first layer while simultaneously moving said platform and said deposition devices relative to one another in a direction parallel to said plane, whereby said second layer solidifies and adheres to said first layer;

operating additional steps of forming multiple layers of said droplet compositions on top of one another by repeated ejecting and depositing of said droplet compositions from said deposition devices as said platform and said deposition devices are moved relative to one another in said direction parallel to said plane, with said deposition devices and said platform being moved away from one another in said third direction by a predetermined layer thickness after each preceding layer has been formed and with the depositing of each successive layer being controlled to take place after said materials in the preceding layer immediately adjacent said deposition device have substantially solidified to form a colorful three-dimensional object.

15. A process as set forth in claim 14, wherein said moving step includes the step of moving said deposition device and said platform relative to one another in a direction parallel to said plane according to a first predetermined pattern to form an outer boundary from at least one of said droplet compositions containing desired colorants on said platform, said outer boundary defining an exterior surface of said object.

16. A process as set forth in claim 15, wherein said outer boundary defines an interior space in said object, and said moving step further includes the step of moving said deposition devices and said platform relative to one another in one direction parallel to said plane according to at least one other predetermined pattern to fill said interior space with at least one of said droplet materials.

17. A process as set forth in claim 16, wherein said program signals determine the movement of said deposition devices and said platform relative to one another in said first predetermined pattern and said at least one other predetermined pattern.

18. A process for making a colorful three-dimensional object, comprising the steps of creating a geometry and color pattern of said three-dimensional object on a computer, said geometry including a plurality of segments defining said object; each of said segments being coded with a color;

evaluating the geometry data files representing said object to locate any un-supported feature of the object, defining a support structure for the un-supported feature, and creating a plurality of segments defining said support structure;

generating program signals corresponding to each of said segments for both said object and said support structure in a predetermined sequence;

providing at least two colorant-containing compositions for said object and one composition for said support structure;

feeding said compositions to at least two droplet deposition devices and operating said deposition devices to eject droplets of said compositions onto an object-supporting platform;

during said ejection step, moving said deposition devices and said object-supporting platform in response to said programmed signals relative to one another in a plane defined by first and second directions and in a third direction orthogonal to said plane in a predetermined sequence of movements such that said compositions are deposited in free space as a plurality of segments sequentially formed so that the last deposited segment overlies at least a portion of the preceding segment in contact therewith to thereby form said support structure and said three-dimensional object of multi-colors.

19. A process as set forth in claim 9, 10, 11, 12, 13, 14, 15, 16, 17 or 18 wherein at least one liquid composition contains white colorant.

20. A process as set forth in claim 19, wherein at least a second liquid composition contains yellow, a third composition contains magenta, a fourth composition contains cyan, and a fifth composition contains black colorant.

21. Apparatus for making a multi-color three-dimensional object on a layer-by-layer basis, comprising:

a computer-aided design computer and supporting software programs operative to create a three-dimensional geometry and color pattern of a desired object, to convert said geometry into a plurality of segments defining the object with each segment coded with a color, and to generate programmed signals corresponding to each of said segments in a predetermined sequence;

a two-dimensional color printing device for providing color inks on demand comprising:

a print head comprising a multiplicity of flow channels each having on first side a discharge orifice of a predetermined size;

a multiplicity of liquid reservoirs each having on one side a pipe means in fluid flow communication with one of said channels at a second side of said channel distal from said orifice;

actuator means located in control relation to each of said channels for actuating ejection of droplets through said discharge orifice;

a cartridge for carrying said print head and being provided with first motion means to move in a first direction, also referred to as X direction;

an object-supporting platform at a predetermined initial distance from said discharge orifices of said print head to receive liquid droplets therefrom;

at least one additional droplet dispensing device at another predetermined distance from said platform for depositing droplets of a baseline body-building liquid composition material thereto;

second motion means coupled to said platform and said droplet dispensing device for moving said dispensing device and said platform relative to one another in an X-Y plane defined by said X direction and a second or Y direction and in a third or Z direction orthogonal to said X-Y plane to deposit said droplets into a three-dimensional object; and a three-dimensional motion controller electronically linked to said computer and said first and second motion means and operative to actuate said motion means in response to said programmed signals for each of said segments received from said computer;

said droplet dispensing device providing a bulk of the materials needed to build the body of said object and said 2-D printing device delivering desired inks to desired locations of said object layer by layer.

22. Apparatus as set forth in claim 21, wherein at least one liquid reservoir contains yellow ink, one contains cyan ink, one contains magenta ink, and one contains black ink and wherein said baseline body-building material contains a white colorant.

23. Apparatus as set forth in claim 21, wherein at least one liquid reservoir contains yellow ink, one contains cyan ink, one contains magenta ink, and one contains black ink and wherein said baseline body-building material is substantially transparent.

24. A method for making a multi-color 3-D object on a layer-by-layer basis, comprising:

(a) providing a computer and supporting software programs operative to create a three-dimensional geometry and a color pattern of a desired object and to convert said geometry and color pattern data into programmed signals in a predetermined sequence;

(b) providing an object-supporting platform with a generally flat surface;

(c) responsive to said programmed signals, operating at least one droplet dispensing device for depositing droplets of a baseline body-building material to build a first portion of a first layer of the object onto said flat surface of the platform;

(d) further responsive to said programmed signals, operating a 2-D color printing device for depositing desired color inks onto said first portion;

(e) repeating (c) and (d) to complete the formation of the first layer; and (f) repeating (c), (d), and (e) to build multiple layers of said object to form a multi-color 3-D object.

25. A method as set forth in claim 24, wherein said 2-D color printer provides desired yellow, cyan, magenta, and black inks on demand and wherein said body-building material comprises a white colorant.

26. A method as set forth in claim 24, wherein said 2-D color printer provides desired yellow, cyan, magenta, and black inks on demand and wherein said body-building material is substantially optically transparent.

27. A method as set forth in claim 24, wherein, for each of said multiple layers, step (c) is operated to complete the formation of said individual layer before step (d) is operated to deposit a color pattern on said individual layer.

28. A method as set forth in claim 27, wherein inks are deposited substantially near the exterior surface only of said object.

29. A method as set forth in claim 27, wherein said 2-D color printer is piezo-electrically activated.

30. A method as set forth in claim 27, wherein said 2-D color printer is thermally activated.

31. A method as set forth in claim 24, wherein said software programs are operated to identify un-supported features of said object and to generate data files for needed support structures and wherein said layer building procedures include steps of building layers for said support structures.

* * * * *